United States Patent [19]
Mott

[11] Patent Number: 5,263,903
[45] Date of Patent: Nov. 23, 1993

[54] CHAIN-BELT

[75] Inventor: Philip J. Mott, Dryden, N.Y.

[73] Assignee: Borg-Warner Automotive Transmission & Engine Components Corporation, Sterling Heights, Mich.

[21] Appl. No.: 17,985

[22] Filed: Feb. 10, 1993

Related U.S. Application Data

[60] Continuation of Ser. No. 939,053, Sep. 2, 1992, which is a division of Ser. No. 720,238, Jun. 24, 1991, Pat. No. 5,167,587, which is a continuation-in-part of Ser. No. 496,565, Mar. 20, 1990, Pat. No. 5,061,226.

[51] Int. Cl.$^5$ .............................................. F16G 1/24
[52] U.S. Cl. ................................... 474/213; 474/214
[58] Field of Search ............... 474/201, 212, 213-217, 474/240, 242, 245

[56] References Cited

U.S. PATENT DOCUMENTS

| | | |
|---|---|---|
| 690,317 | 12/1901 | Renold . |
| 1,138,237 | 5/1915 | Morse ............................ 474/213 |
| 1,638,139 | 8/1927 | Belcher . |
| 1,868,334 | 7/1932 | Morse . |
| 2,038,583 | 3/1934 | Maurer ........................... 474/242 |
| 2,475,264 | 7/1949 | Sutton ............................ 474/242 |
| 3,407,672 | 10/1968 | Keller ............................. 474/242 |
| 3,720,113 | 3/1973 | Van Doorner et al. ........ 474/242 |
| 3,949,621 | 4/1976 | Beusink et al. . |
| 4,058,021 | 11/1977 | Wood . |
| 4,292,031 | 9/1981 | Rattunde . |
| 4,313,730 | 2/1982 | Cole, Jr. et al. ............... 474/201 |
| 4,337,057 | 6/1982 | Horowitz et al. . |
| 4,342,560 | 8/1982 | Ledvina et al. . |
| 4,344,761 | 8/1982 | Steuer . |
| 4,386,921 | 6/1983 | Roberts .......................... 474/242 |
| 4,386,922 | 6/1983 | Ivey ................................. 474/242 |
| 4,392,843 | 7/1983 | Smit ................................ 474/245 |
| 4,428,740 | 1/1984 | Moore . |
| 4,464,152 | 8/1984 | Kern ................................ 474/245 |
| 4,498,892 | 2/1985 | Huntley .......................... 474/242 |
| 4,507,106 | 3/1985 | Cole, Jr. ......................... 474/245 |
| 4,512,754 | 4/1985 | Cole, Jr. et al. ............... 474/245 |
| 4,516,963 | 3/1985 | Mott ............................... 474/245 |
| 4,516,964 | 3/1985 | Laster ............................. 474/245 |
| 4,516,965 | 5/1985 | Mott ............................... 474/245 |
| 4,526,559 | 7/1985 | Smirl .............................. 474/245 |
| 4,526,560 | 7/1985 | Swain ............................. 474/245 |
| 4,545,779 | 10/1985 | Sakakibara et al. . |
| 4,547,182 | 10/1985 | Rattunde . |
| 4,553,953 | 11/1985 | Bock .............................. 474/201 |
| 4,569,671 | 2/1986 | Ledvina .......................... 474/201 |
| 4,580,999 | 4/1986 | Ledford ........................... 474/201 |
| 4,581,000 | 4/1986 | Ferfecki .......................... 474/201 |
| 4,581,001 | 4/1986 | Rattunde et al. .............. 474/201 |
| 4,618,338 | 10/1986 | Rattunde et al. . |
| 4,622,025 | 11/1986 | Kern et al. ..................... 474/245 |
| 4,631,042 | 12/1986 | Rattunde . |
| 4,645,479 | 2/1987 | Bateman et al. .............. 474/242 |
| 4,650,444 | 3/1987 | Sakakibara et al. .......... 474/201 |

(List continued on next page.)

FOREIGN PATENT DOCUMENTS

| | | |
|---|---|---|
| 0127255 | 5/1984 | European Pat. Off. . |
| 0183428 | 4/1986 | European Pat. Off. . |
| 2848167 | 7/1980 | Fed. Rep. of Germany . |

OTHER PUBLICATIONS

Copy of Japanese Abstract, Appln. No. JP860293508 Publication No. JP63149448; Aug. 1988.

*Primary Examiner*—Thuy M. Bui
*Attorney, Agent, or Firm*—Emch, Schaffer, Schaub et al.

[57] ABSTRACT

A chain-belt that extends between driving and driven members such as the pulleys of a continuous variable transmission wherein the chain-belt is formed of a plurality of interleaved sets of links. The links define a passageway and a plurality of load blocks are positioned in the passageway. Several members for reducing the noise produced by such a chain-belt are disclosed whereby certain of the load blocks in the chain-belt engage the pulleys at a different location to alter and reduce the pattern of noise produced by the chain-belt. The chain-belt also has links with a particular configuration that allows the links to have a short pitch length while still maintaining strength in the links.

40 Claims, 22 Drawing Sheets

U.S. PATENT DOCUMENTS

| | | |
|---|---|---|
| 4,650,445 | 3/1987 | Mott .................................... 474/201 |
| 4,655,732 | 4/1987 | Takashima . |
| 4,692,130 | 9/1987 | Novak ................................. 474/201 |
| 4,698,050 | 10/1987 | Hattori et al. . |
| 4,708,701 | 11/1987 | Cole, Jr. . |
| 4,710,154 | 12/1987 | Rattunde . |
| 4,718,880 | 1/1988 | Zimmer ............................... 474/201 |
| 4,737,137 | 4/1988 | Miyaishi . |
| 4,738,654 | 4/1988 | Cole, Jr. ............................... 474/201 |
| 4,758,210 | 7/1988 | Ledvina . |
| 4,764,158 | 8/1988 | Honda et al. ..................... 474/215 X |
| 4,767,388 | 8/1988 | Tatara et al. . |
| 4,776,829 | 10/1988 | Yamamuro et al. . |
| 4,795,409 | 1/1989 | Okuwaki et al. ................... 474/245 |
| 4,832,668 | 5/1989 | Ledvina et al. . |
| 4,904,231 | 2/1990 | Zimmer . |
| 4,907,778 | 3/1990 | Schonnenbeck . |
| 4,915,675 | 4/1990 | Avramidis .......................... 474/213 |
| 4,927,404 | 5/1990 | Rattunde . |
| 5,007,883 | 4/1991 | Cole, Jr. et al. .................... 474/245 |
| 5,026,332 | 6/1991 | Mott et al. .......................... 474/245 |
| 5,090,948 | 2/1992 | Orth ................................... 474/245 |
| 5,147,250 | 9/1992 | Mott ............................... 474/214 X |

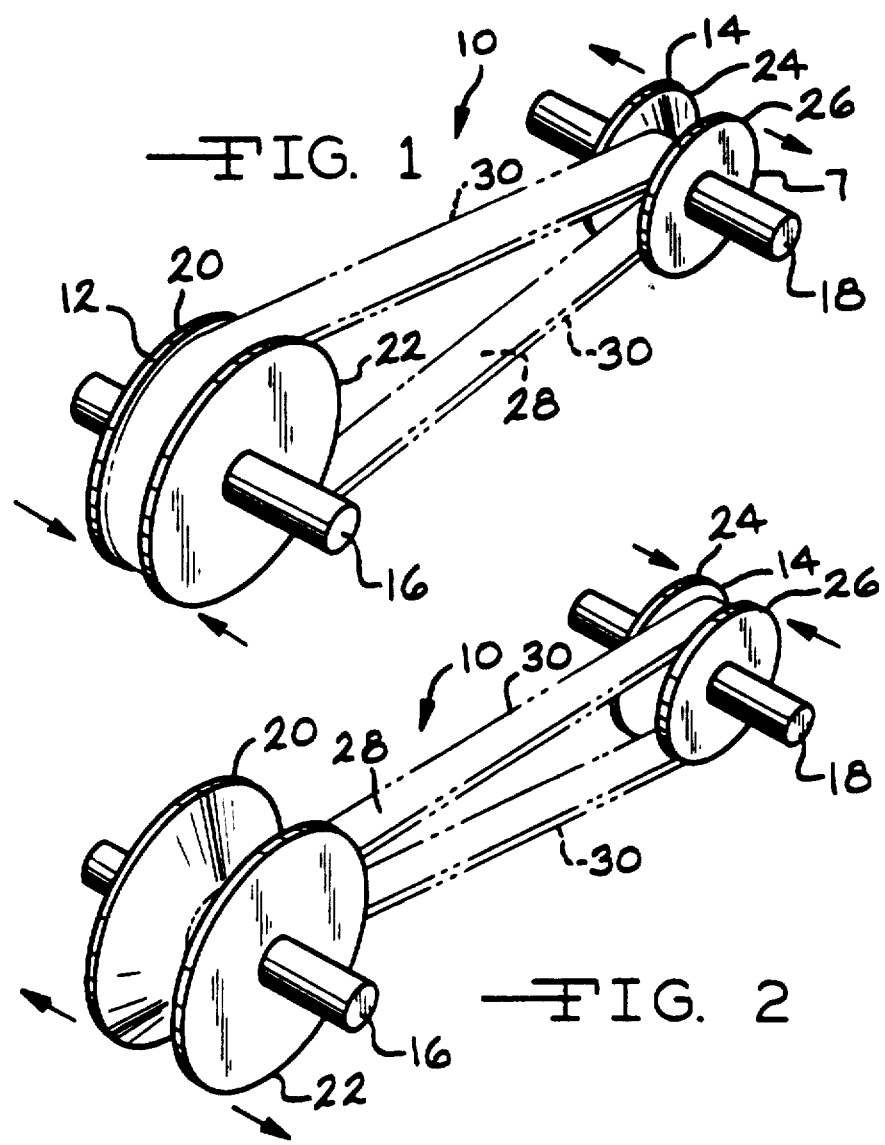

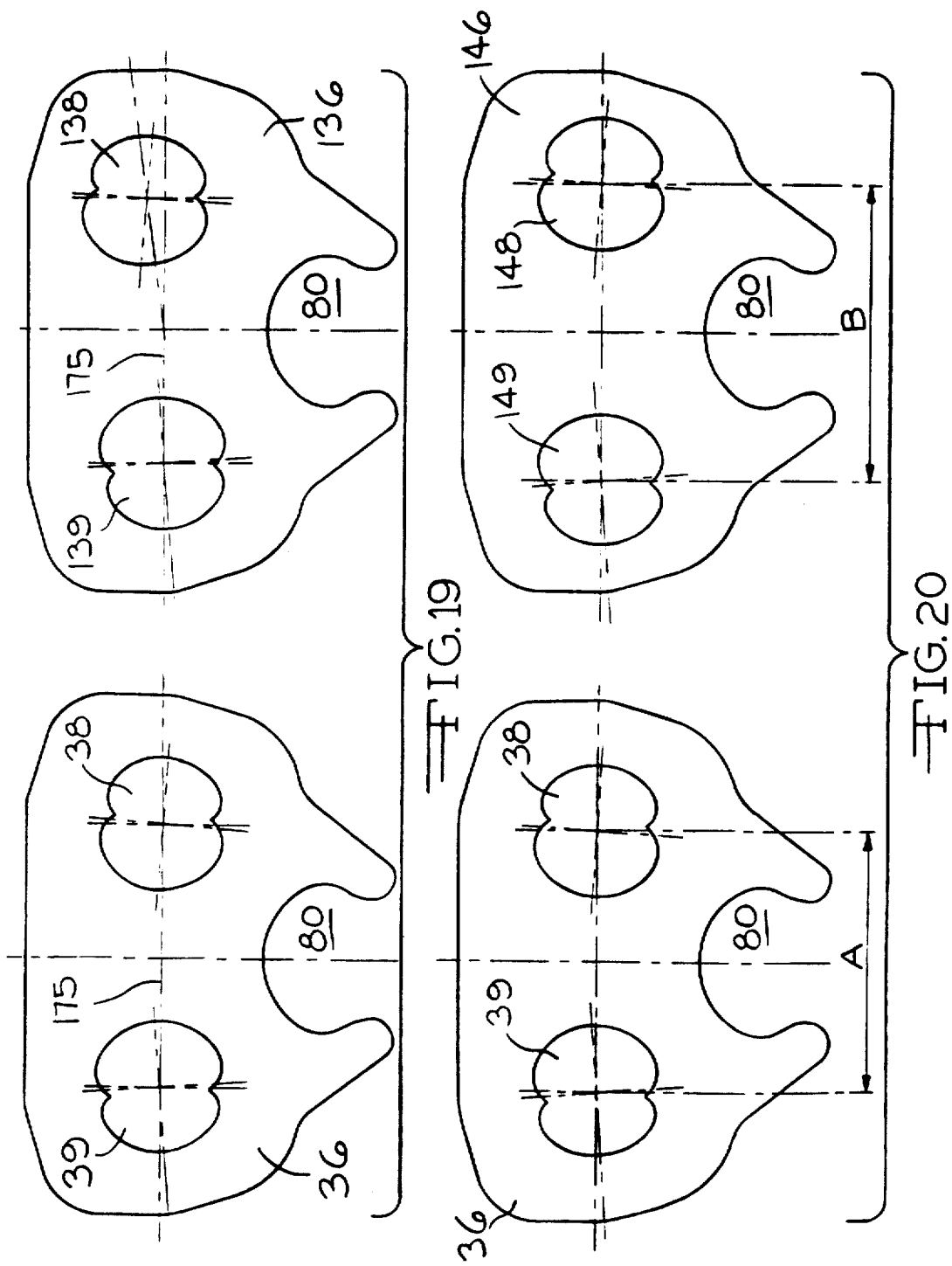

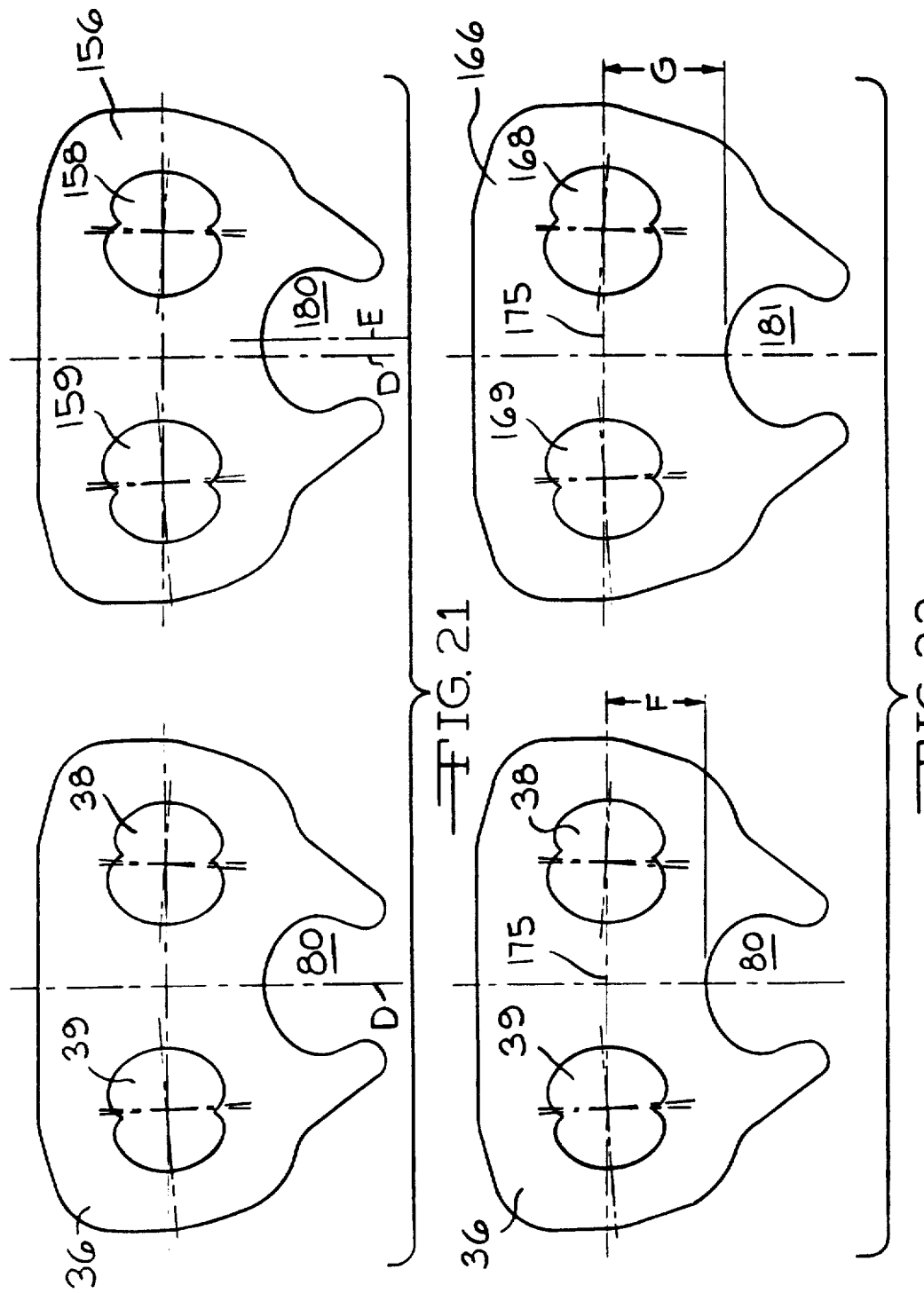

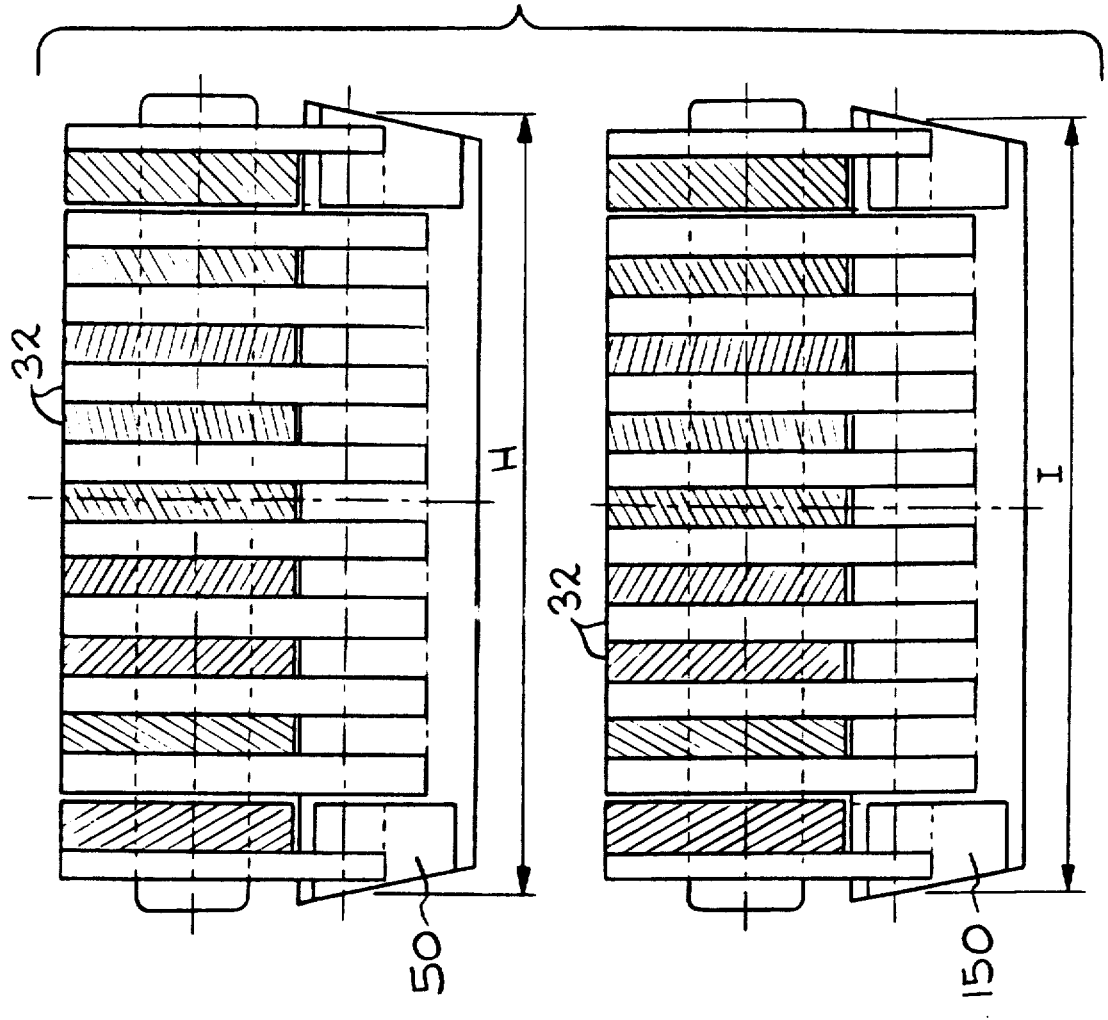

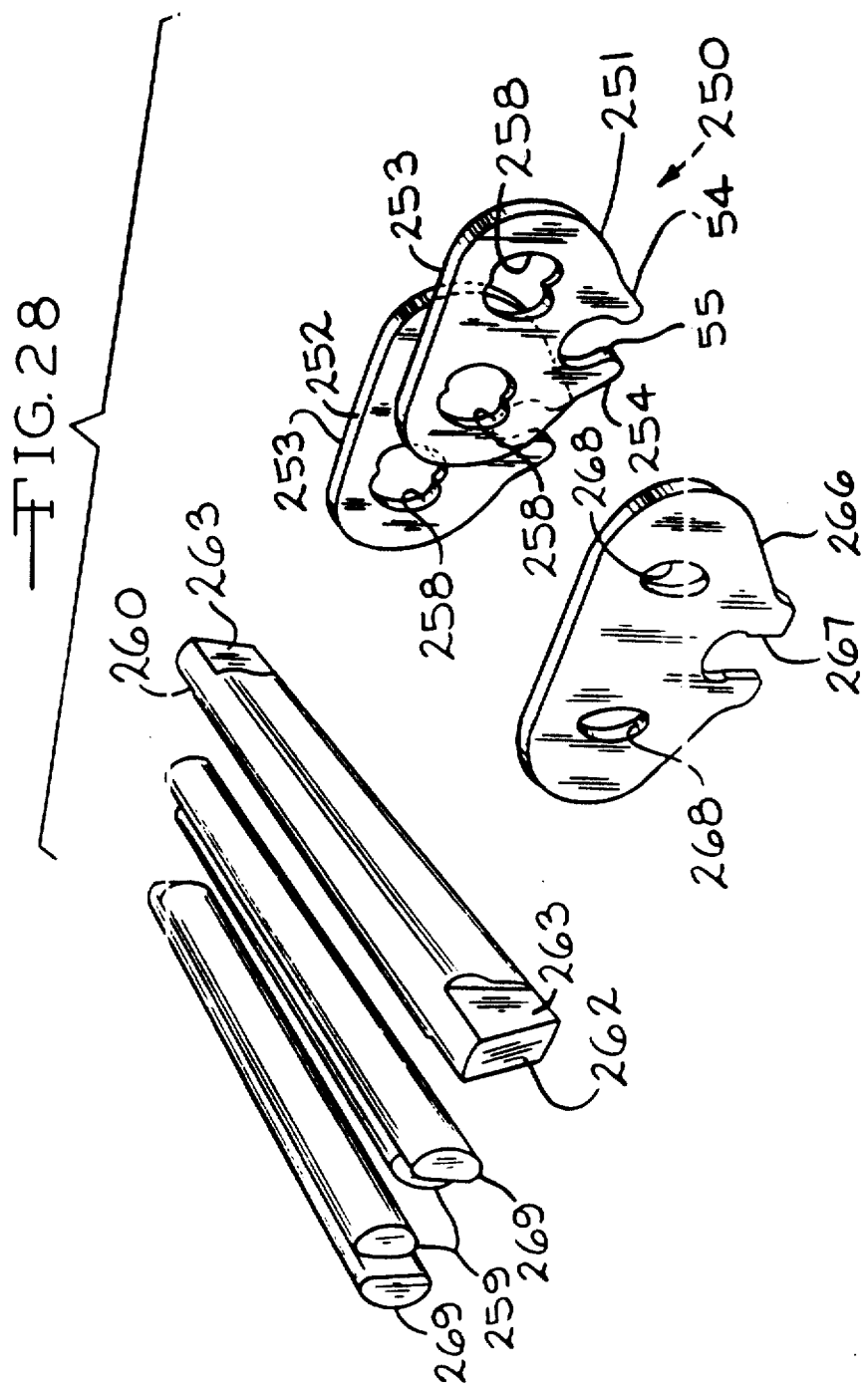

CHAIN-BELT

This is a continuation of copending application(s) Ser. No. 07/939,053 filed on Sep. 2, 1992 which is a division of U.S. Ser. No. 07/720,238, filed Jun. 24, 1991, now U.S. Pat. No. 5,167,587, issued Dec. 1, 1992 which is a continuation-in-part of U.S. Ser. No. 07/496,565, filed Mar. 20, 1990, now U.S. Pat. No. 5,061,226 issued Oct. 29, 1991.

TECHNICAL FIELD

This invention relates to metal chain-belts especially adapted to connect the pulleys of a pulley transmission, particularly a continuously variable transmission (CVT), and broadly comprises a tension member or carrier constructed of a plurality of interlaced links arranged in transverse sets with the adjacent sets joined by pivot means, and load blocks carried by the carrier for engaging the pulleys.

BACKGROUND ART

Variable pulley transmissions for transferring torque from an input or drive shaft to an output or driven shaft have been used for some time. In these transmissions, a first pulley constructed of a pair of flanges, at least one of which is conical, is mounted on the input shaft such that at least one of its flanges is axially movable with respect to its other flange. A second, similarly constructed and adjustable pulley is mounted on the output shaft. A flexible belt connects the two pulleys to transfer torque therebetween when the input shaft is driven. As the effective diameter of one pulley is changed, the effective diameter of the other pulley is changed in the other direction and, the drive ratio between the input and output shafts is adjusted in a smooth, continuous manner.

Automotive engineers have long recognized that the maximum operating efficiency of the engine could be achieved if the transmission could be controlled by adjusting to different loads and speed ratios, such that the engine is maintained and operated at its maximum efficiency operating conditions. This has not been possible when a conventional geared transmission is teamed with an engine. In the conventional geared transmission, the drive ratio is adjusted in discrete steps, rather than continuously. Accordingly, efforts have been directed to the use of a continuously varible transmission (CVT) of the type described above. The efforts have resulted in the production and marketing in Europe of the DAF passenger car, using flexible, continuous rubber belt to drivingly interconnect the pulleys. Rubber belts have been considered to be inferior to metal belts because of various adverse conditions under which they must operate. More recently, Fiat and Volvo have produced automobiles incorporating CVT's using respectively, metal belts and rubber belts. Some of the efforts to produce metal belts which are durable, relatively quiet in operation, and also economical to market, are described in the patent and other literature.

Flexible metal belts for use in CVT's are generally of two varieties, those referred to as "push" belts and those referred to as "pull" belts. Push belts are currently being used in the Fiat automobile's CVT. An example of a push belt is described in Van Doorne et al., U.S. Pat. No. 3,720,113 and an example of a pull belt is described in Cole, Jr., et al., U.S. Pat. No. 4,313,730. The Van Doorne et al. belt comprises an endless carrier constructed of a plurality of nested metal bands and an endless array of generally trapezoidal (when viewed from the front) load blocks encircling the carrier and longitudinally movable therealong. Each block has edge surfaces engaging the pulley's flanges of a pulley transmission to transmit torque between the pulleys. The pull belt of Cole, Jr. et al., utilizes an endless chain as the carrier, the sets of links of which are pivotably interconnected by pivot means. Load blocks, similar to those of Van Doorne et al., encircle the links; however, the load blocks are contrained against longitudinal movement along the chain by the pivot means.

Another example of a pull belt is shown in Ledvina, U.S. Pat. No. 4,569,671 which utilizes a chain-belt comprising a plurality of interleaved sets of links and load blocks associated therewith. Each link is defined by toes, the toes of each link being defined by parallel inside flanks joined by a crotch. A load block is received between the inside flanks and extends around the links. A hardened insert is located between the links and the blocks to protect the links and improve the durability of the chain.

The push belt as described above is relatively expensive to manufacture and must be installed and/or replaced as a complete endless loop. Thus, disassembly of at least part of the pulley transmission is required, not only for the initial assembly, but also for replacement of the push belt due to failure of one or more load blocks or one or more of the carrier bands.

The pull belt offers a less expensive alternative to the push belt. No precise matching of carrier parts is required. The belt can be assembled with a finite length, positioned around the pulleys, and the ends then connected by a pivot member. Thus disassembly of the pulleys is not required in either for initial installation or replacement of a belt.

Aside from costs, a major concern of automotive engineers is noise generation by drive belts for pulley transmissions. Noise of a mixture of frequencies is less objectionable to humans than noise of pure frequencies. Currently an evaluation used by some automotive engineers is to rate noise generated by drive belts of the type described herein in a generally subjective manner by driving or riding in an automobile in which the belt is installed and listening to the generated noise. The noise is then rated on a numerical scale of 1 to 10 with the higher numbers indicating the less objectionable noise. Belts achieving a rating of about 6 and above are usually acceptable for use in automotive drives, and can be classified as being of commercial quality. Of course such belts must also be durable, so as to have a reasonable operating life.

Various ways have been suggested for constructing belts for use in a CVT which operate in such a manner to generate noise acceptable to humans, and a discussion of some of these ways will be found in the prior art. A description of some of the prior art follows.

U.S. Pat. No. 4,464,152 discloses a chain-belt that has sound damping means interleaved with load block laminations.

U.S. Pat. No. 4,516,964 discloses load blocks of different transverse widths, all of which contact the pulley flanges, but some at a different radial location on the pulley flanges from others, thus modifying the generated noise pattern.

U.S. Pat. No. 4,516,965 discloses some load blocks do not contact the pulley flanges, or some load blocks are missing or "skipped", to thus modify the generated noise pattern.

U.S. Pat. No. 4,516,963 discloses a random mixture of load block-pulley flange engaging areas to provide a pattern of random engagement thereof with the pulley flanges, and thus a modified generated noise pattern.

A suggested way to modify the generated noise pattern in a chain in which the pivot means drivingly contacts the pulley flanges is to provide a drive chain constructed of a mixture of links of different pitches, such as U.S. Pat. No. 4,344,761, issued Aug. 17, 1982.

U.S. Pat. No. 1,868,334, issued Jul. 19, 1923, teaches constructing a chain for use with sprockets which provides a mixture of distances between adjacent centers of articulation or a mixture of "effective pitches" in order to "break up rythmic vibrations that sometimes cause trouble in chain drives". The patent is silent as to whether or not this "trouble" is noise related.

The invention to be described herein relates to chain and chain-belts which are used to connect sprockets or pulleys of power transmissions. The invention finds particular use for connecting the pulleys of a continuously variable transmission, commonly known as a CVT. In the description which follows, reference will be made to chain, it being understood that this includes not only tooth chains, also known as silent chain, but also structures known as chain-belts, which comprise a carrier of connected chain links, pivot means connecting interleaved chain links and drive blocks. The invention is primarily applicable to that variety of chain-belt known as pull belts.

DISCLOSURE OF THE INVENTION

A chain-belt that extends between driving and driven means such as the pulleys of a continuous variable transmission wherein the chain-belt is formed of a plurality of interleaved sets of links. The links define a passageway and a plurality of load blocks are positioned in the passageway. Several means for reducing the noise produced by such a chain-belt are disclosed whereby certain of the load blocks in the chain-belt engage the pulleys at a different location to alter and reduce the pattern of noise produced by the chain-belt. The chain-belt also has links with a particular configuration that allows the links to have a short pitch length while still maintaining strength in the links.

BRIEF DESCRIPTION OF THE DRAWINGS

FIG. 1 is a schematic illustration of a continuously variable transmission (CVT).

FIG. 2 is a schematic illustration of a continuously variable transmission.

FIG. 19 is a front view of a link design of the invention.

FIG. 20 is a front view of another link design.

FIG. 21 is a front view of a link design of the invention.

FIG. 22 is a front view of a link design of the present invention.

FIG. 23 is a cross-sectional view of a chain-belt of the invention.

FIG. 28 is an exploded perspective view showing the components of another embodiment of a chain, according to the present invention;

BEST MODE FOR CARRYING OUT THE INVENTION

Figure 3:
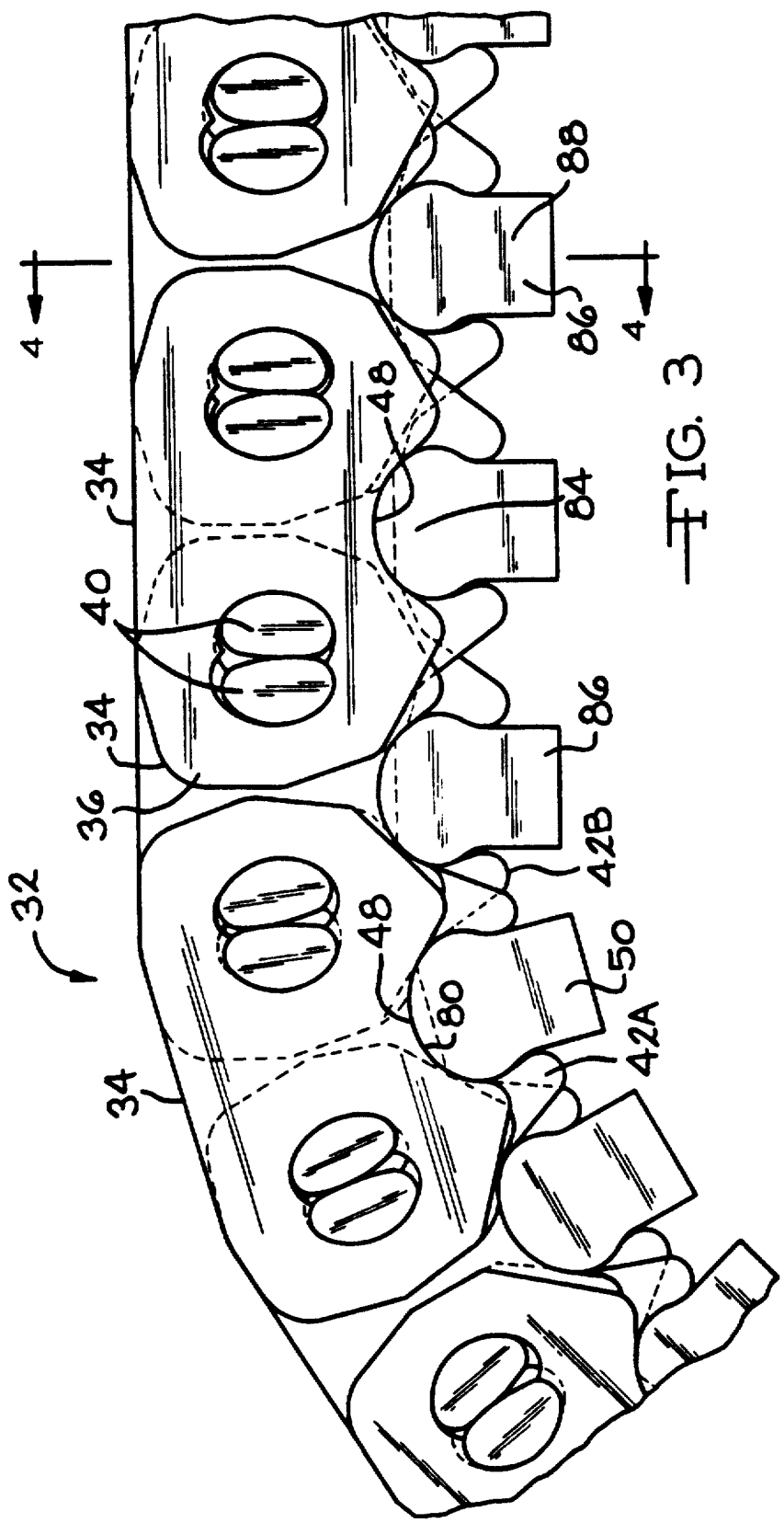
FIG. 3 is a side view of the chain-belt of the present invention.

FIGS. 1 and 2 illustrate schematically a CVT 10 in two drive ratios. CVT 10 comprises a pair of pulleys 12 and 14 connected respectively to shafts 16 and 18, one of which is the driven shaft and the other of which is the drive shaft. Pulley 12 comprises a pair of flanges 20, 22, at least one of which is conical, and pulley 14 comprises a pair of flanges 24, 26, at least one of which is conical. The pulleys are connected by a belt 28, the side edges 30 of which frictionally engage the pulley flanges. At least one flange of each pulley is axially movable with respect to the ether, so as to vary the drive ratios between the pulleys. The arrows indicate the axial movement of the flanges to effect the different drive ratios. Means-beyond the scope of this invention-can be provided for axially moving at least one flange relative to the other.

Figure 4:
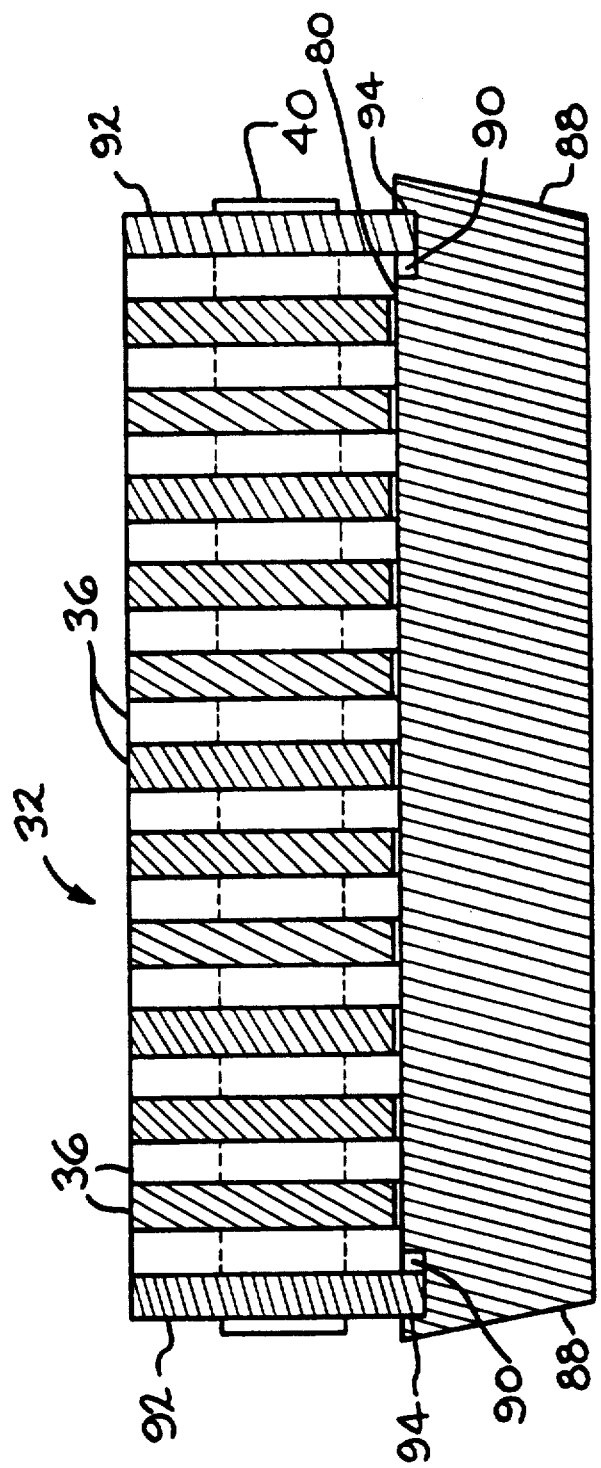
FIG. 4 is a cross-sectional view taken along line 4—4 in FIG. 3.
Figure 5:
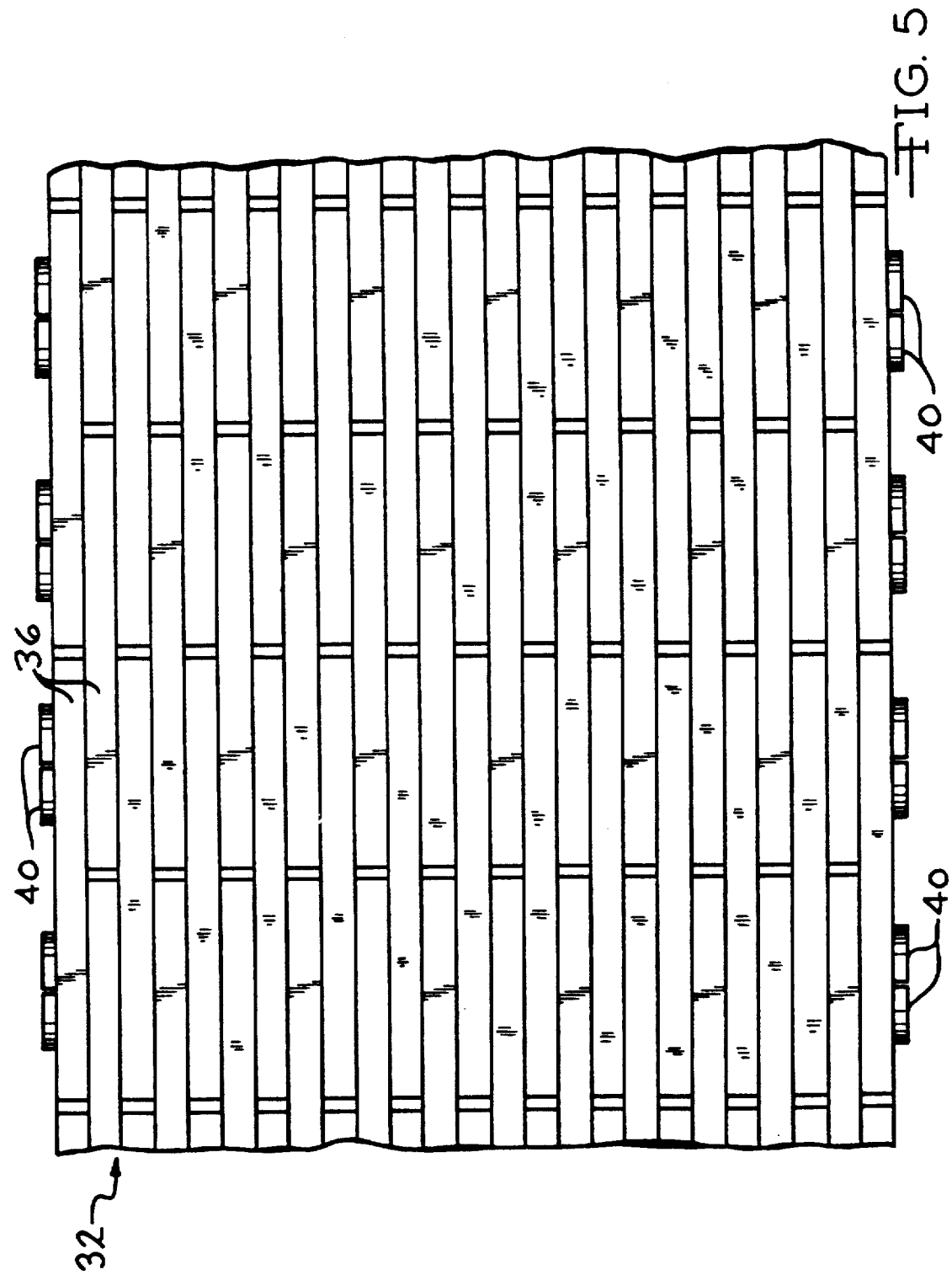
FIG. 5 is a plan view of the chain-belt.
Figure 6:
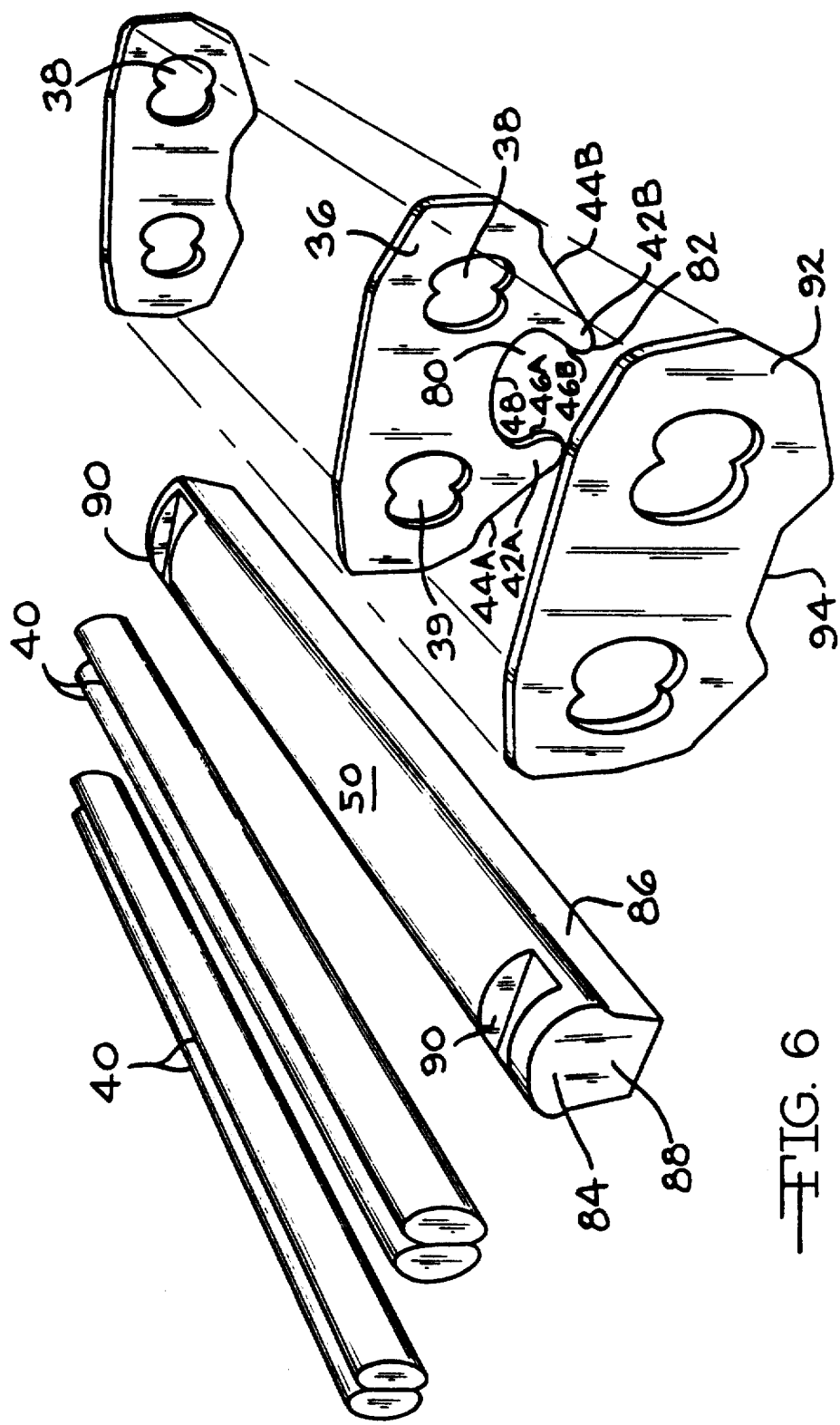
FIG. 6 is an exploded perspective view showing the components of the chain-belt of the present invention.

The chain-belt 32 of this invention (see FIGS. 3 and 4 showing segments of the chain-belt 32) comprises a plurality of interleaved or laced sets 34 of links 36, each link having a pair of spaced apertures 38, 39. The apertures are arranged so that pivot means 40 join adjacent sets of links to thus permit the chain-belt to articulate. Pivot means 40 are shown as being of the pin and rocker variety but any known type of pivot means may be used.

Because of the lacing, alternate sets of links have a different number of links than the other sets of links.

Each link has a pair of toes 42A, 42B, which are defined by outside flanks 44A, 44B, and inside flanks 46A, 46B. The toes 42A, 42B are disposed to extend from the links in a direction towards the shafts 16, 18 of the CVT when the chain-belt is properly positioned on the CVT. The inside flanks are in spaced apart, generally opposed relationship. The inside flanks have an arcuate shape and are joined together by a curved crotch 48. The configuration of the inside flanks and the curved crotch 48 result in the opposed toes forming a substantially circular passageway 80 with the ends of the toes that are spaced apart from the pivot pins defining an opening 82.

A load block 50 is associated with each sets of links and is received in the passageway 80 formed by the opposed toes. The upper region 84 of the load blocks has the same basic shape as the passageway 80 and is only slighty smaller in size to allow the load blocks to be positioned in the passageway. The load blocks have a lower portion 86 that extends from the passageway and has ends 88 that are designed to engage the flanges of the pulleys of the CVT 10. The load blocks are preferably a solid metal block that provide a great deal of strength and resistance to wear as the CVT operates. However, it should be understood that the load blocks can be made from more than one piece of solid metal.

The load blocks 50 have a groove or notch 90 at each end. The notch is located in the upper region 84 of the load block that faces the passageway 80. The chain-belt has a retaining link 92 that is positioned as the outer link on each side of the chain-belt. The retaining links 92 have a projection 94 which extends into the passageway 80 defined by the opposed toes. The projection 94 is disposed to engage the notch 90 on the load blocks to restrain the load blocks 50 from movement in a direction transverse to the direction of travel of the chain-belt 32. In this configuration the notches 90 also act to assist in holding the links 36 together as the notches also keep the links from separating from one another.

When the chain-belt is in operation the upper region of the load blocks 50 is pushed into contact with the curved crotch 48 area of the links when the chain-belt contacts the pulleys 12 and 14 of the CVT 10. The curved crotch is a very strong section of the link and is very effective in handling the load placed on the load blocks 50. The forces encountered by the load blocks 50 are effectively distributed across the width of the links 36 and directed to the portion of the links where the links are very strong. The toes 42A and 42B do not receive much of the forces placed on the load blocks 50 by the pulleys of the CVT 10.

Figure 18:
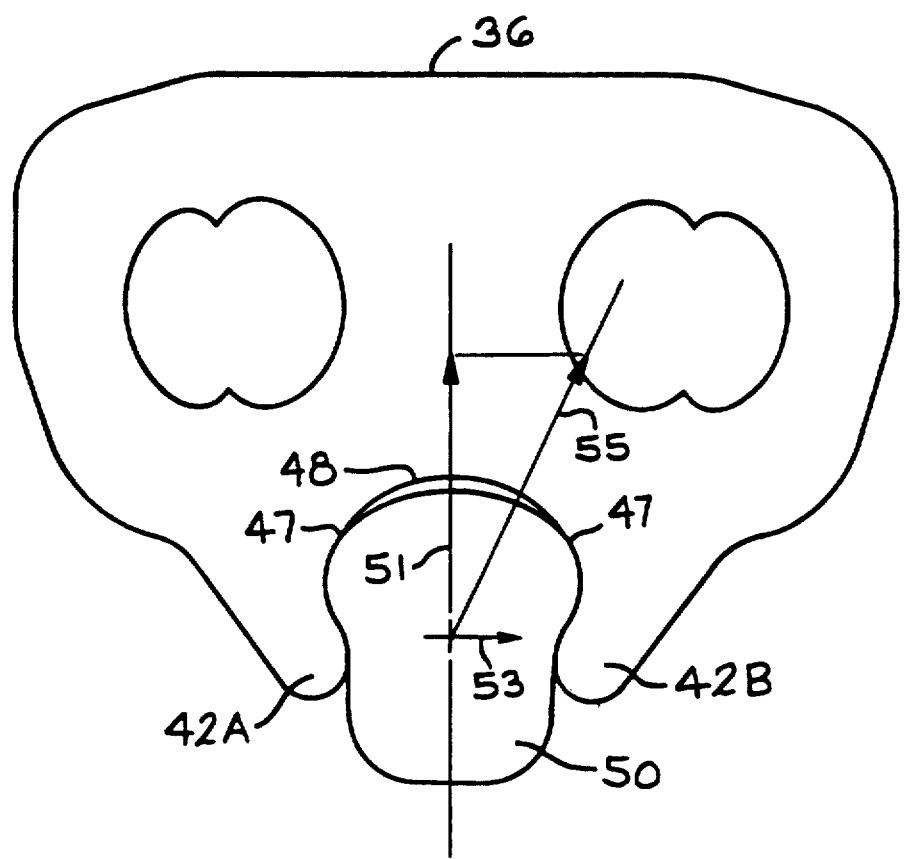
FIG. 18 is a partial side elevation view of a portion of the present invention.

The flanges of the pulleys of the CVT 10 place essentially two types of loads on the load blocks 50. The forces acting on the load blocks are shown in FIG. 18. The primary load or force on the load blocks is in a radial direction that is generally perpendicular to the direction of travel of the chain-belt. The radial force, shown as arrow 51, acts to push the load blocks 50 in a direction toward the crotch 48 of the links 36. There is also a smaller force acting on the load blocks 50 that is substantially in the tangential direction or same direction as the direction of travel of the chain-belt 32. The tangential forces are shown as arrow 53 in FIG. 18. The resultant force vector, shown as arrow 55, that results from the combination of the large radial force 51 and the smaller tangential force 53 always acts between points of contact 47 in the crotch area 48 of the links 36 as shown in FIGS. 3 and 18. The crotch 48 is also constructed so that the crotch area contacts each side of the load blocks 50 at points of contact 47. These points of contact on each side of the load blocks 50 act to stabilize the load blocks and acts to substantially eliminate rotation of the load blocks during use of the chain-belt 32. As noted above the contact areas in the crotch 48 of the links 36 at points of contact 47 are disposed so that the resultant force vector that acts on the load blocks is always between the points of contact 47. Accordingly, the load blocks 50 are always contacted on each side by the contact area of the crotch 48 and this substantially eliminates any tendency of the load blocks 50 to rotate. Most of the forces acting on the load blocks 50 are transferred to the crotch area 48 of the links 36 and very little force is directed to the toes 42A and 42B of the links.

Although each link 36 has been described as having a pair of toes it should be recognized that it is only necessary that the toes form a passageway 80 for receiving the load blocks 50. It is possible for each link to have only one toe with the toes on adjacent links being disposed in opposed relationship to form the passageway for the load blocks 50. It is also not necessary that the toes form a substantially circular passageway 80. The toes can have different shapes as long as the passageway formed by the toes is capable of receiving the load blocks 50 and maintaining the load blocks in position adjacent the links 36. The portion of the load blocks 50 located in the passageways should preferably be shaped to transfer forces from the CVT 10 in the manner previously described.

The above construction allows the chain-belt 32 to be substantially as wide as the load blocks 50, resulting in a higher tensile capacity for this chain-belt. On prior chain-belts, the chain-belt often passed through a window or opening in the load blocks and the chain had to be narrower than the load blocks. This effectively reduced the maximum size of the chain and reduced the maximum load carrying capacity for the chain. By suspending the load blocks 50 below the chain-belt 32, the chain-belt can be wider. This allows more or heavier links to be used for the chain-belt to improve the load carrying capacity of the chain-belt. Since the load blocks 50 are positioned below the chain-belt 32 this increase in width can be accomplished without increasing the effective width of the chain-belt that is contacting the pulleys 12 and 14 of the CVT 10. In practice it has been found that the chain-belt 32 of the present invention has approximately 55% more tensile capacity than the above discribed prior art chain that is used in a CVT.

The load blocks 50 of the present invention are preferably monolithic blocks that drive directly against the links of the chain-belt 32. The monolithic load blocks 50 are stronger than the prior art load blocks that were formed from several plates that were positioned in adjacent relationship to form a load block. These prior art load blocks also contained a window or opening and the chain-belt was positioned in the opening. The present load blocks preferably are a solid piece and do not have an opening or window extending through the load block. These load blocks 50 are considerably stronger than the prior art load blocks and more readily accept the high loads and difficult operating conditions that exist in a CVT. The outside edges 60 of the load blocks are shaped to engage the flanges of the pulleys 12 and 14 of the CVT 10. It is relatively easy to create a uniform outside surface 60 for contacting the pulleys when the load block is a solid metal load block. If the plates of some of the prior art load blocks varied slightly in size or were positioned differently around the chain-belt, slight variations could be present on the outside edges that were disposed to contact the pulleys of the CVT. Such variations can result in an uneven outside surface for the load block. In this situation not all of the plates that form the load block may be contaced by the pulleys of the CVT. When this occurs there is uneven load sharing between the plates that form the load block and the load block is less effective in transferring torque between the pulleys and in resisting wear during use of the CVT. The solid, monolithic blocks of the present invention eliminate the above deficiency of some of the prior art load blocks.

The load blocks 50 of the present invention are easy to position on the chain-belt 32. The load blocks are positioned in the passageway 80 formed by the opposed toes 42A and 42B that extend from each link 36 of the chain-belt. It is easy to position the load blocks in the passageway 80 and then use the retaining links 92 to secure the load blocks from movement in the passageway. This is a much easier construction method than prior art load blocks that required the chain-belt to be positioned in an opening in the load block. The load blocks were then held in place by the pins that secured adjacent sets of links together. This prior art system essentially required the load blocks to be positioned on the chain-belt during the formation of the chain-belt. Such a structure is more difficult and expensive to utilize than the load blocks of the present invention. Accordingly, the present invention provides a chain-belt for a CVT that is much cheaper and easier to assemble than many prior art chain-belts.

The load blocks 50 of the present invention drive directly against the links of the chain-belt. The load placed upon the load blocks 50 by the pulleys of the CVT is transferred to the crotch area 48 of the links 36. This load is spread across the entire width of the chain-belt 32. This is a very effective way to transfer the force from the load block 50 to the chain-belt 32. In many prior chain-belts the load blocks were held in place on the chain-belt by the pivot pins that joined the adjacent sets of links to form the chain-belt or by tabs on the links. These systems resulted in very high loads on a small portion of the pins or links and the load blocks. Such high loads frequently limited the forces that could be effectively handled by such a chain-belt construction. The present invention provides a system for transferring the forces from the load blocks 50 to the chain-belt 32 which significantly improves the load carrying capacity of the chain-belt.

Figure 7:
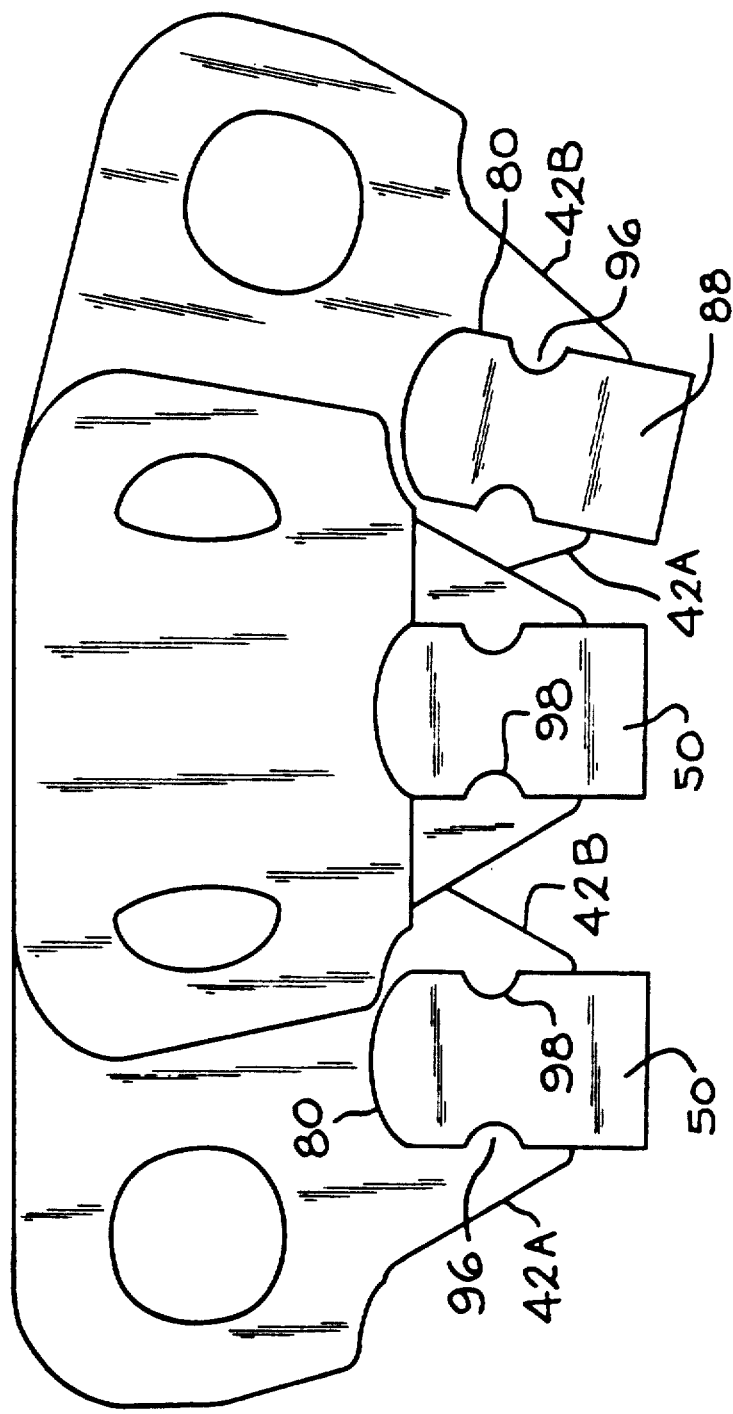
FIG. 7 is a side elevation view of another embodiment of the present invention.

FIG. 7 shows another embodiment of the invention wherein each toe 42A, 42B, has a projection 96 that extends into the passageway 80. A groove 98 is located on each side of the load blocks 50. The grooves 98 are disposed to be in alignment with the projections 96 located on the toes. When the load blocks 50 are positioned on the chain-belt 32 the projections 96 extend into grooves 98 and act to retain the load blocks 50 in position adjacent to the links 36 of the chain-belt.

Figure 8:
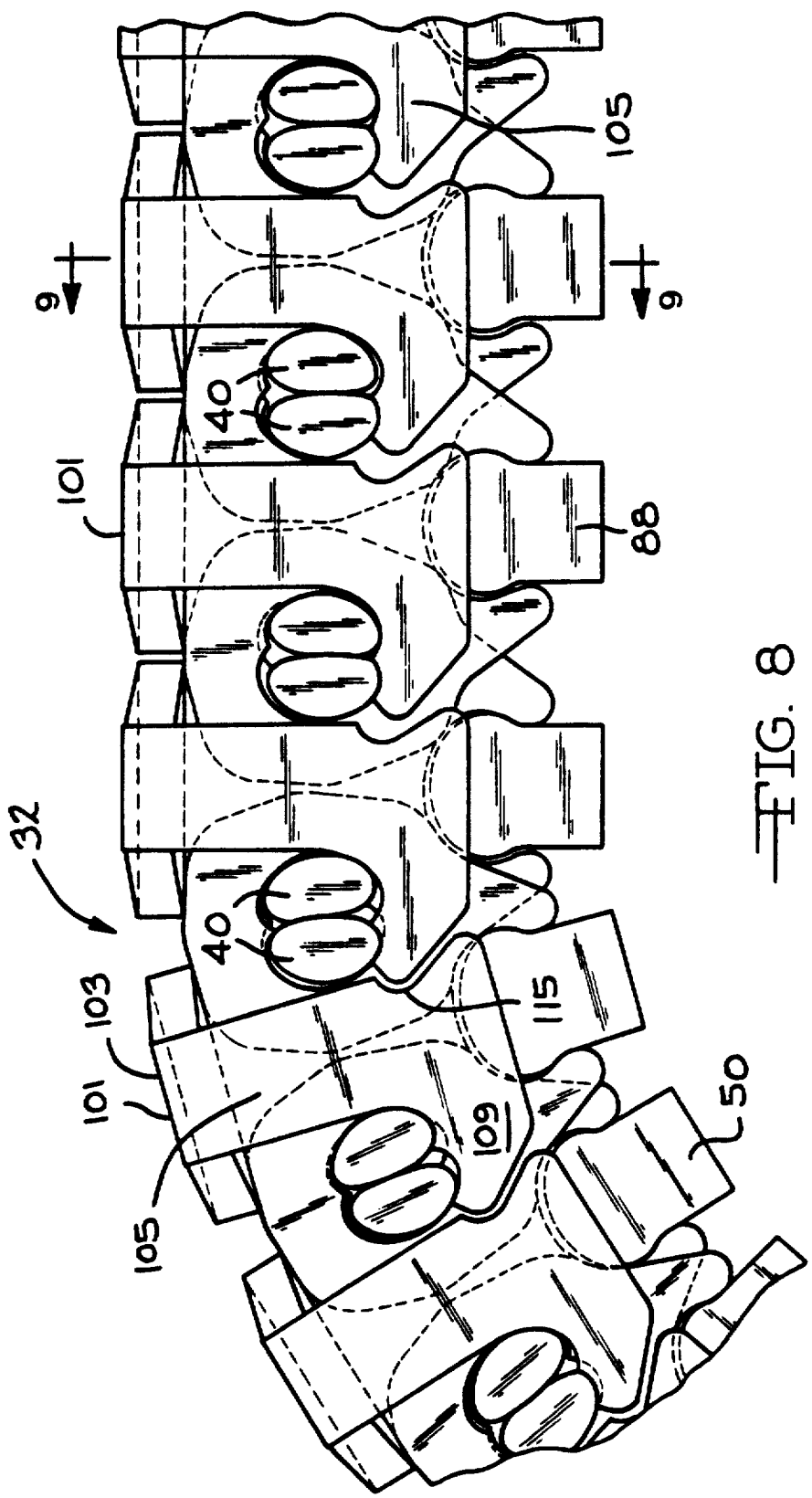
FIG. 8 is a side elevational view of another embodiment of the present invention.
Figure 9:
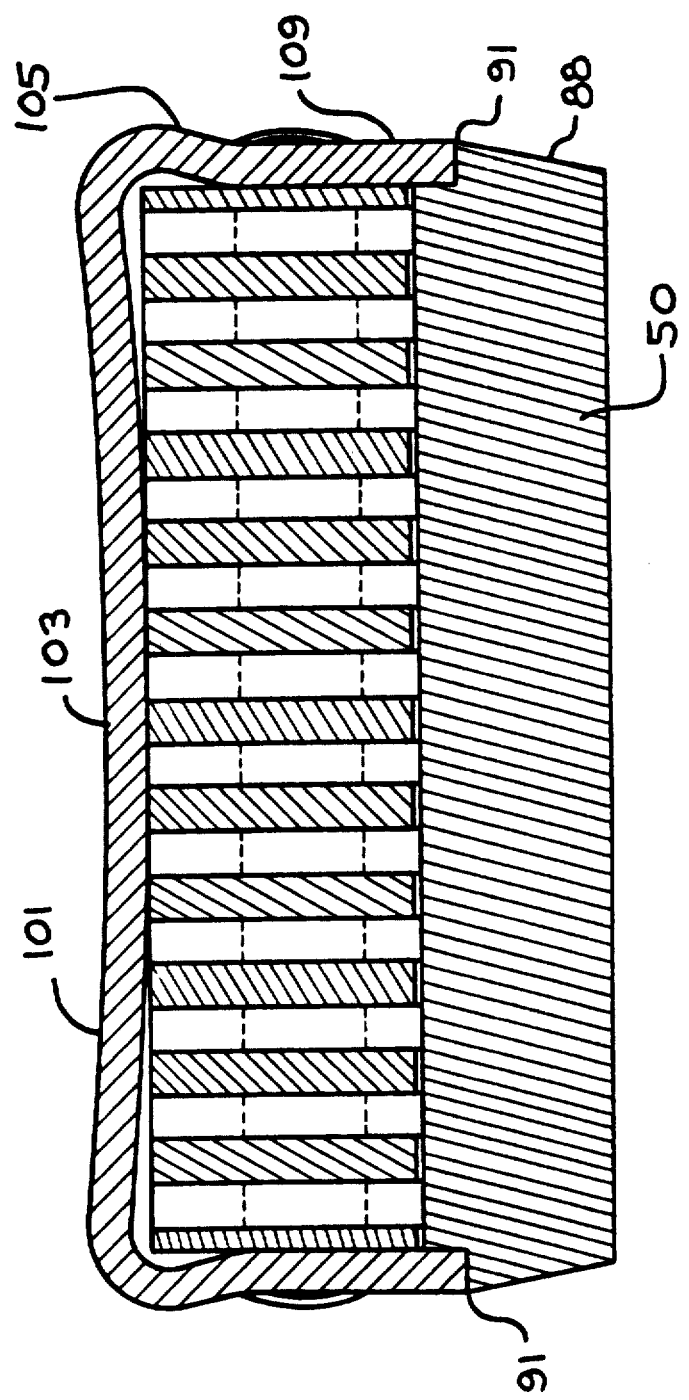
FIG. 9 is a cross-sectional view taken along line 9—9 in FIG. 8.
Figure 10:
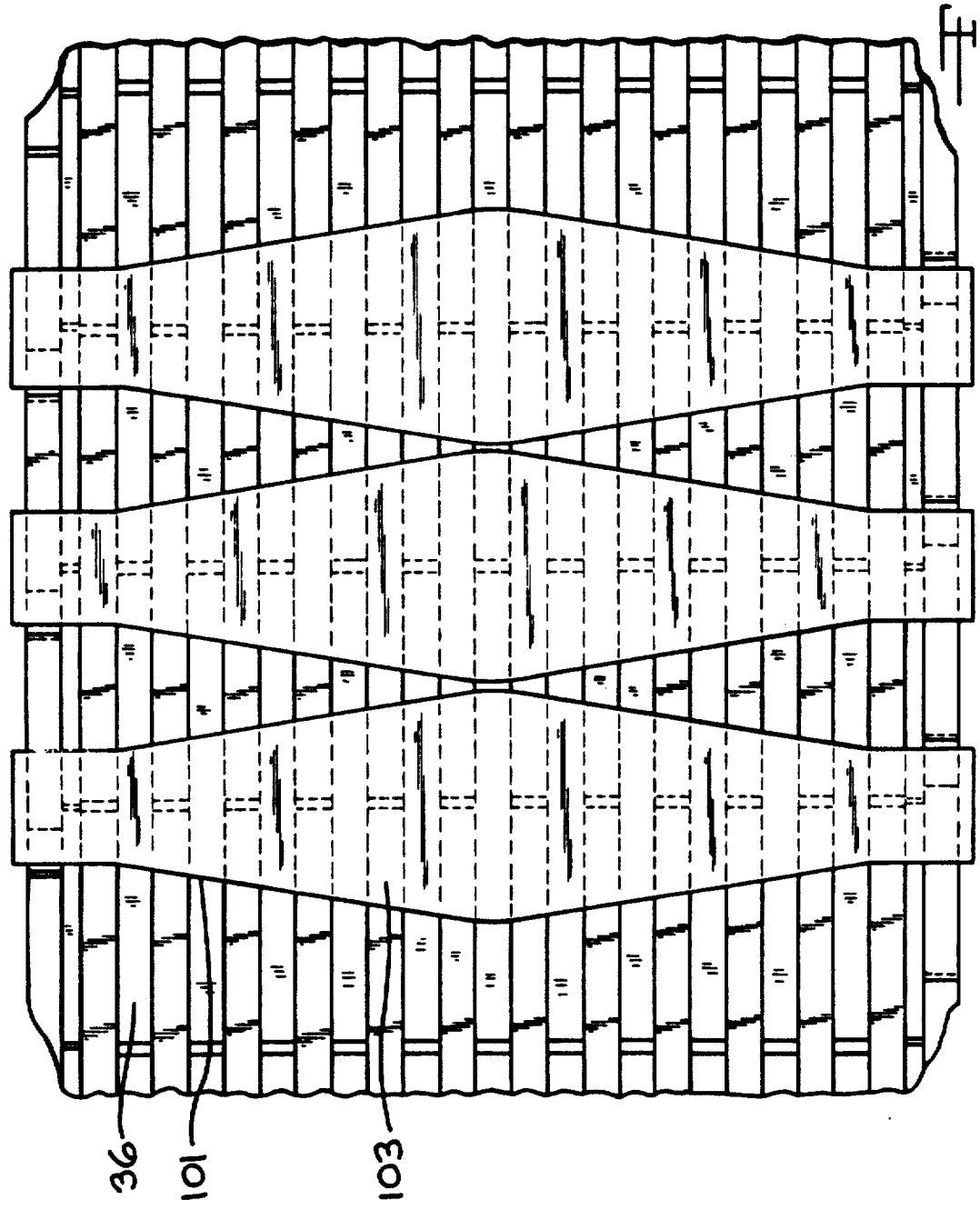
FIG. 10 is a top view of the embodiment of FIG. 8.

FIG. 8, 9, 10 and 11 show another embodiment that can be used to restrain the load blocks 50 from transverse movement on the chain belt 32. In this embodiment a plurality of retainer brackets 101 are used to secure the load blocks 50 to the chain belt. The retainer brackets 101 are positioned on each set 34 of links 36 and have a first section 103 that extends across the side of the links 36 that is in spaced apart, opposed relationship to the passageway 80. A second section 105 of the retainer bracket extends along the sides of the links. The second section 105 terminates in a foot 109 and the foot extends under the pivot means 40. The pivot means secures each end of the retainer bracket 101 to the chain-belt 32. The retainer bracket also extends over at least a portion of the ends of the load blocks 50 to retain the load blocks from movement transverse to the direction of travel of the chain-belt. The notch 91 on the ends of the load blocks 50 can be disposed to receive the foot 109 on the second section 105 of the retainer bracket 101. As shown in FIGS. 9 and 10 the notch 91 can be positioned at the very end of the load blocks 50. The notches 91 on the ends of the load blocks 50 can be made slightly larger than the thickness of the foot 109 on the retainer bracket 101. This construction for the notches 91 allows the load blocks 50 to move slightly in a transverse direction in the passageways 80 to allow the load blocks 50 to be aligned as the load blocks 50 pass through the pulleys of the CVT 10. However, the retainer brackets 101 still function to keep the load blocks 50 in the passageways 80 formed by the links 36.

Figure 11:
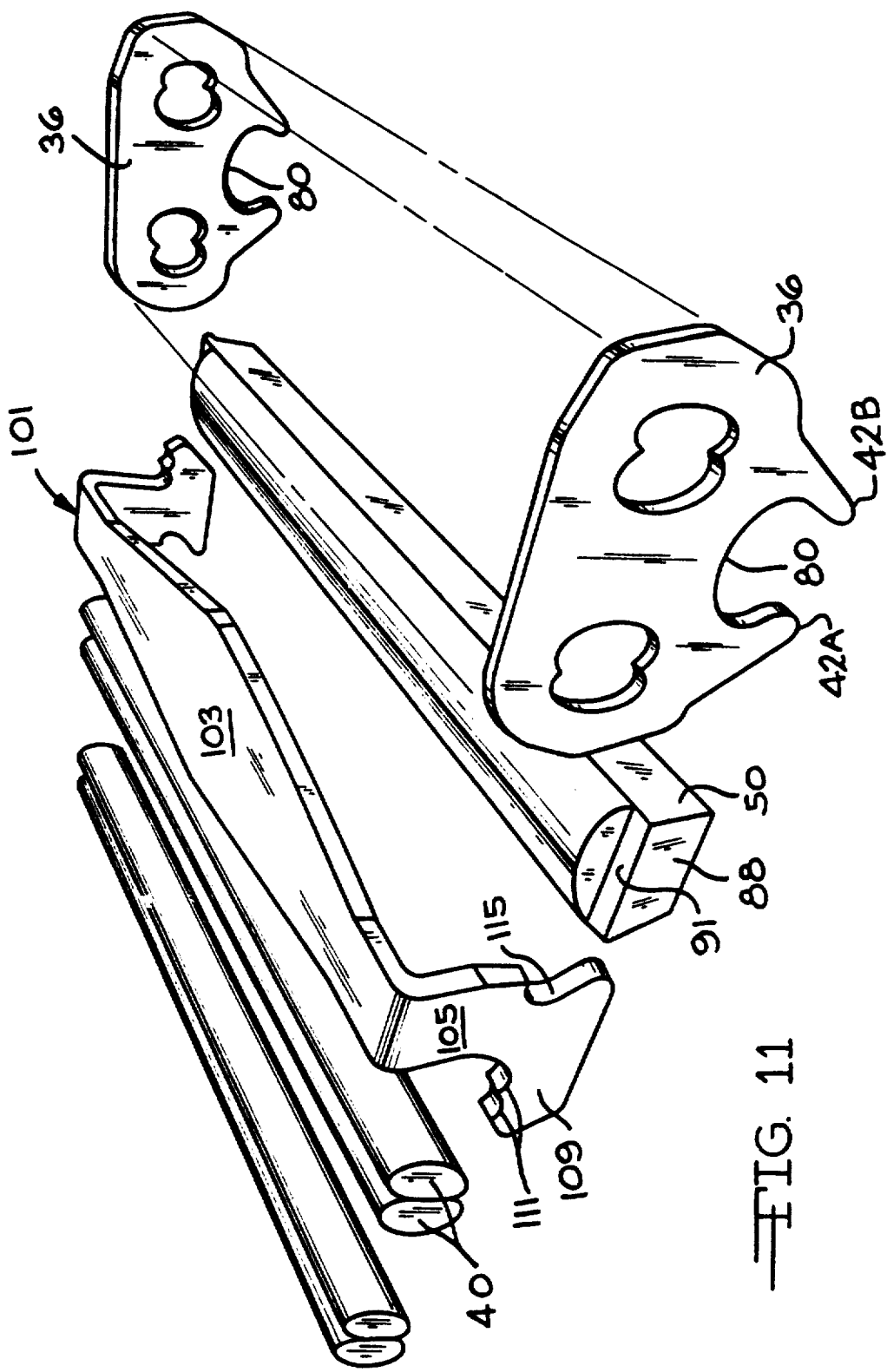
FIG. 11 is an exploded perspective view showing the components of this embodiment.

The retainer bracket 101 can have second sections 105 that are symetrical or the second sections can be asymetrical. In practice it has been found to be preferable to have the second sections be asymetrical as shown in FIGS. 8 and 11. With an asymetrical configuration a foot 109 on each side of the retainer bracket 101 extends in opposite directions and each foot 109 engages a pivot means 40 located at one end of the sets of links 36. In this manner the retainer bracket 101 is held by the pivot means 40 associated with one set of links and there is no relative motion between the pivot means and the retainer bracket. The foot 109 on each end of the retainer bracket can have a grooved section 111 that is disposed to be in alignment with the pivot means 40. The grooved section 111 allows the pivot means to rotate without causing substantial movement in the retainer bracket. The second section 105 is also constructed so that there is a clearance with the pivot means 40 so that rotation of the pivot means 40 does not cause the retainer bracket 101 to move.

A recess 115 can also be positioned on the second section 105 of the retainer bracket 101 in opposed relationship to the foot 109. The recess 115 is disposed to receive the foot 109 on the adjacent retainer bracket 101. This allows adjacent retainer brackets to nest together to take up less space and to have less possible interference as the chain-belt articulates.

The first section 103 of the retainer bracket can also be curved in a manner to deflect towards the links 36. When the retainer bracket 101 is positioned on the links 36 the first section is displaced by the links and acts like a spring. Accordingly, the first section 103 acts to pull the second section 105 in a direction away from the load blocks 50. As the foot 109 is positioned under the pivot means 40 the spring action of the first section 103 acts to keep the foot 109 on each side of the retainer bracket 101 in contact with the pivot means 40. The spring action of the first section 103 thereby assists in maintaining the retainer bracket 101 in position on the chain-belt.

The embodiment shown in FIGS. 8-11 functions basically in the same manner as the previously described chain-belt and has the same advantages of the previously described chain-belt. In addition, it is very easy to position the load blocks 50 in the passageway 80. After the sets of links 36 have been completely assembled, the load blocks 50 can be positioned in the passageway 80 and the retainer brackets 101 positioned on the chain-belt to hold the load blocks 50 in position in the passageway 80.

Figure 12:
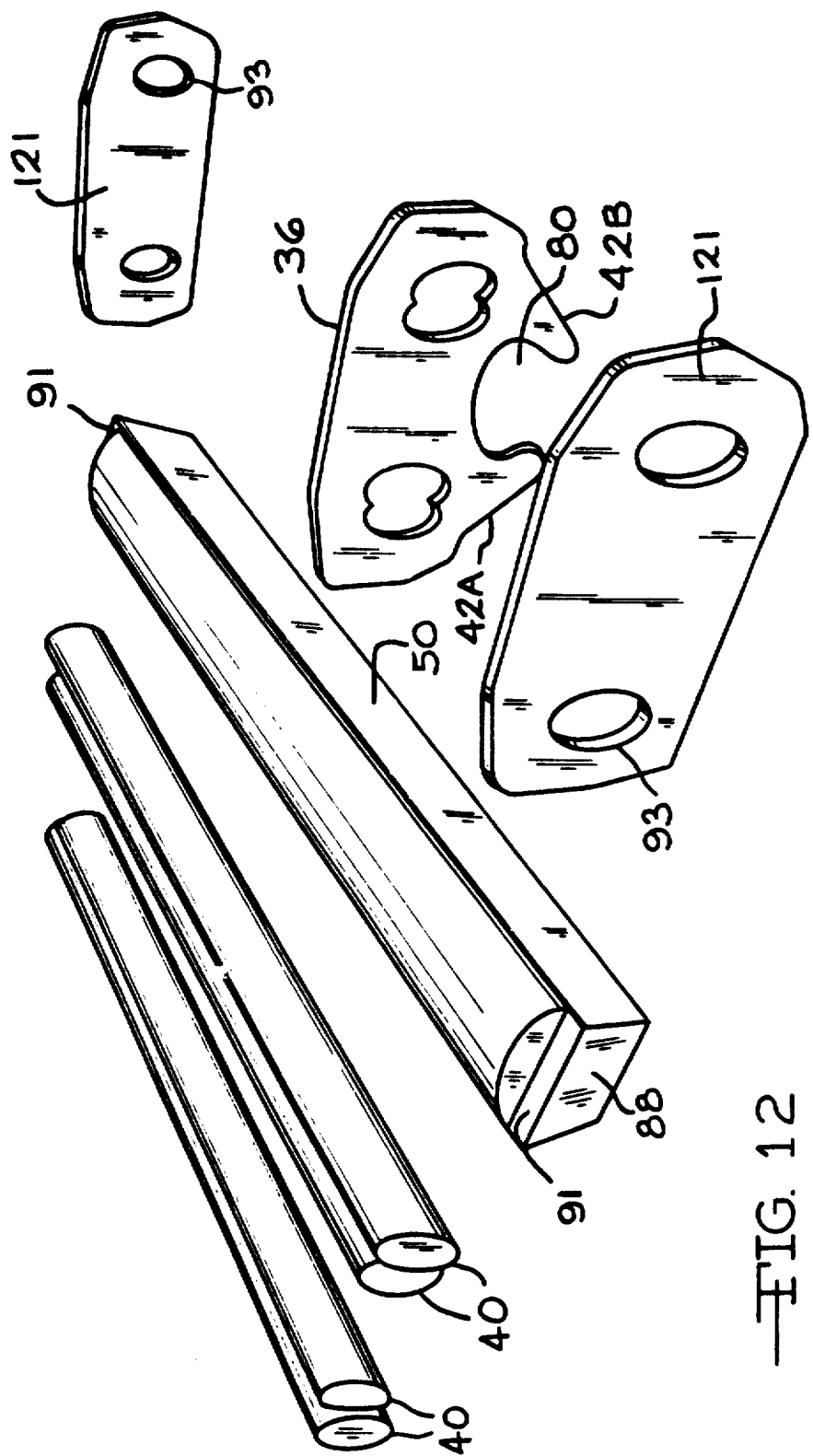
FIG. 12 is an exploded perspective view showing the components for another embodiment of the present invention.
Figure 13:
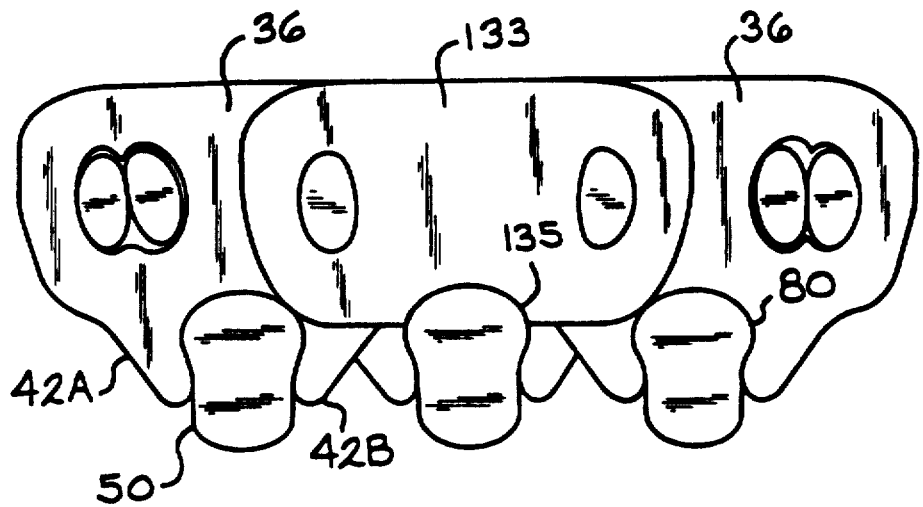
FIG. 13 is a side elevation view of another embodiment of the invention.
Figure 15:
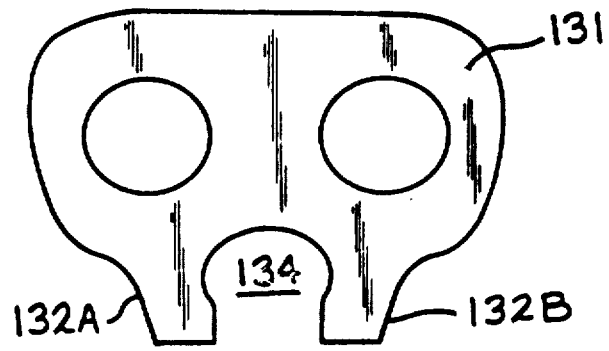
FIG. 15 is a side elevation view of the component of FIG. 14.

FIG. 12 shows another embodiment of the invention where the load blocks 50 have a notch 91 that is located on each end of the load block 50. The notches 91 are cut into the very end of the load blocks 50. A guide link 121 is positioned as the outer link on each side of the chain-belt 32. The guide links 121 extend into the notches 91. Ends of selected ones of the pin pivot means 40 are fit into end openings 93 of the guide links 121. The guide links 121 act to restrain the load blocks 50 from movement in a direction transverse to the direction of travel of the chain-belt 32. The guide links 121 also act to retain the load blocks 50 in the passageway 80 formed by the toes on the links 36. The notches 91 can be made slightly larger than the thickness of the guide links 121 to allow slight transverse movement of the load blocks. This slight transverse movement of the load blocks allows the load blocks to be aligned as the load blocks 50 pass through the pulleys of the CVT 10. The slight transverse movement of the load blocks also reduces wear between the load blocks 50 and the guide links 121.

Figure 14:
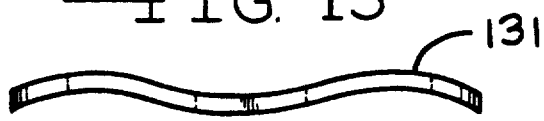
FIG. 14 is a plan view of a component of the embodiment of FIG. 13.
Figure 16:
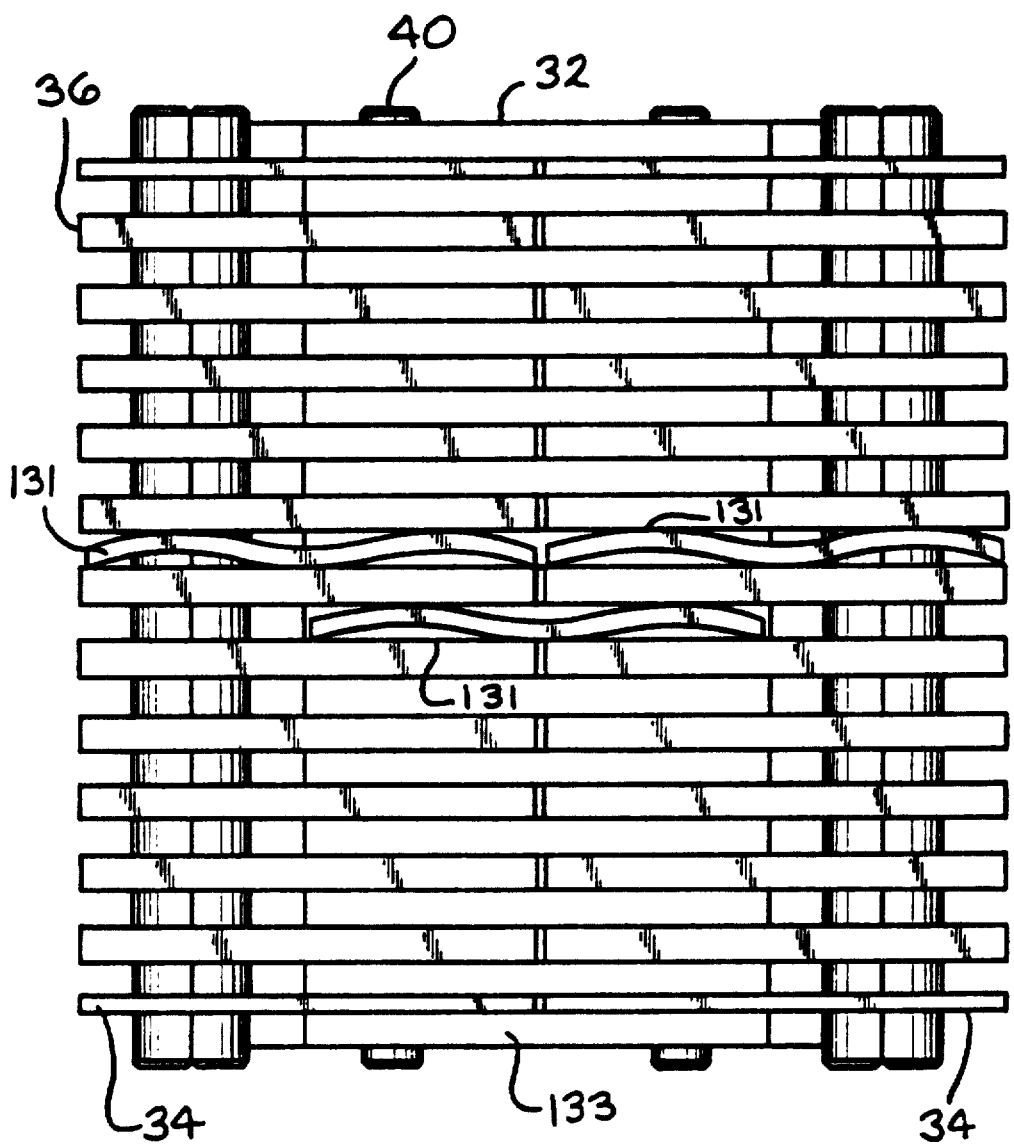
FIG. 16 is a plan view of this embodiment of the invention.
Figure 17:
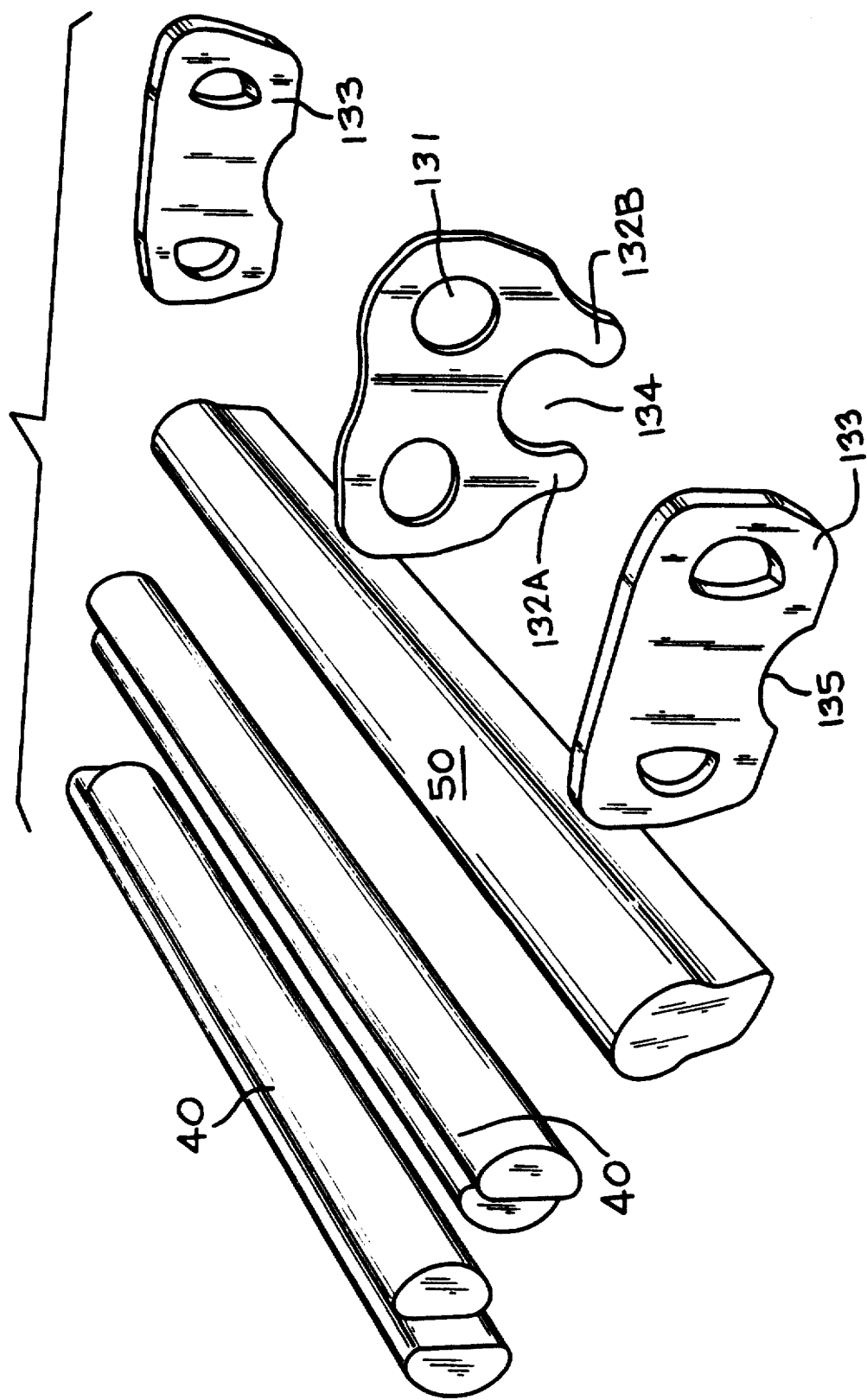
FIG. 17 is an exploded perspective view showing the components of the embodiment of FIG. 13 of the invention.

FIGS. 13–17 show another embodiment of the invention where a spring link 131 is positioned in the previously described chain-belt 32. The spring link 131 has toes 132A and 132B and forms a channel 134 for the load bocks 50. One spring link 131 is positioned in each set of links 36 of the chain belt. The channel 134 of the spring link is in substantial alignment with the passageway 80 formed by the other links 36 of the chain-belt 32 for receiving the load blocks 50. However, the channel 134 of the spring link 131 is slightly smaller than the passageway 80 and the load block 50 is press fit into the channel 134 so that the load block is secured to the spring link 131. The spring link 131 thereby acts to hold the load block from being displaced in a transverse direction from the passageway 80. The spring link 131 has a substantially sine wave shape when viewed from the top of the chain-belt as shown in FIG. 14. The sine wave shape allows the spring link 131 to flex or bend in a transverse direction to accomodate small transverse movement of the load blocks 50. This small transverse movement keeps the load blocks 50 from moving relative to the spring link 131 and maintains the press fit between the load block 50 and the spring link 131. Without the ability of the spring link 131 to move with the load block 50 the press fit would be loosened as the load blocks 50 were aligned as the load blocks 50 move through the pulleys of the CVT 10. The use of the spring link 131 allows the grooves or notches to be eliminated from the load blocks 50. The retaining links 133 on each side of the chain-belt 32 that hold the links of the chain-belt together have a groove 135 that fits over the top of the load block 50. The use of the spring link 131 eliminates possible wear problems between the retaining links and the notches in the load blocks. This construction for the chain-belt also allows the load blocks 50 to be inserted into the passageway 80 as a secondary operation after the links 36 of the chain-belt have been assembled. This simplifies and reduces the cost of assembling the chain-belt. Although only one spring link 131 has been shown in each set 34 of links 36, it should be understood that more than one spring link can be used if desired and that different positions in the set of links can be utilized for the spring links.

FIG. 19 shows a feature of the invention that can be utilized to reduce noise that is produced during the utilization of the chain-belt 32 of this invention. This noise reduction concept is based on the technology in U.S. Pat. No. 4,650,445 for a prior art chain-belt. The U.S. Pat. No. 4,650,445 is hereby expressly incorporated by reference into this patent application as this will greatly simplify the explanation of the features of the invention. The primary differences between the instant invention and the disclosure of the '445 patent is that a different type of link, load block, and system for securing the load block to the sets of links is utilized in the present invention.

As shown in FIG. 19, on the left hand side there is a standard link 36 that can be used to build a chain-belt 32 as previously described in this patent application. The link has spaced apertures 38 and 39 and a passageway 80. A load block 50, as previously described, is positioned in the passageway 80. The centers of the apertures 38 and 39 are positioned on a line 175 that extends substantially along the longitudinal centerline of the link 36.

On the right hand side in FIG. 19, there is a link 136 which can also be used to form sets of links for a chain-belt 32. The link 136 has a pair of longitudinally spaced apertures 138, 139. The link 136 also has a passageway 80 that is disposed to accept a load block 50, as previously described. In the link 136 at least one of the longitudinally apertures 138, 139, is spaced from the line 175 which passes substantially along centerline of the link 136. As shown in FIG. 19, the center of aperture 138 is displaced a small distance above the line 175 and the center of aperture 139 is located on the line 175. However, it should be understood that the centers of the longitudinally spaced apertures can be spaced above or below the line 175 and that the apertures 138, 139, can both be offset from the line 175. The apertures 138, 139, can both be offset from the line 175 in the same direction or in opposite directions. Usually the apertures 138, 139, can be offset in either direction from the line 175 up to approximately 5% of the pitch length for the link 136.

When forming a chain-belt 32, each link in a set of links would have the same orientation for the apertures. However, each individual set can be composed of links that have an aperture orientation that is different than the links in the other sets. A chain-belt can be composed of sets of conventional links 36 with at least one set of links 136 where the apertures have been translated with respect to a reference line 175. It is also possible to have the chain-belt 32 have a mixture of sets of links where each set of links has a certain orientation. If constructed of differently oriented sets of links, the sets of links can be connected in a random pattern or a predetermined pattern to form a complete chain-belt. The chain-belt so constructed will have a substantially constant pitch. The link 136 can be described as having "translated" or "off-set" apertures.

The significance of the utilization of the links 136 in sets a chain-belt 32 is that the load blocks 50 positioned in the passageway 80 formed by the links 136 would be at a slightly different orientation than the load blocks 50 positioned in the passageway 80 formed by the standard links 36. Accordingly, the load blocks 50 associated with the translated aperture links 136 will strike the sheaves of a pulley at a different location that the load blocks 50 associated with the standard links 36. This disrupts the pattern of noise that is produced as the load blocks 50 strike the sheaves of the pulleys of a continuously variable transmission. It also changes the pattern of the chordal action associated with the chain-belt 32 as it enters and leaves the pulleys of the CVT as described in the '445 patent.

FIG. 20 shows another feature of the invention that can be utilized to reduce the noise generated by the chain-belt 32 during use. On the left hand side of FIG. 20 there is shown a standard link 36 as previously described. The standard link 36 has a pitch length A that is the distance between the center point for the two apertures 38 and 39. On the right hand side of FIG. 20 is another link 146 that can be positioned in a second set of links that form the chain-belt 32. The link 146 has spaced apart apertures 148 and 149. The pitch for the link 146 is represented by the line B that extends between the center points for the apertures 148 and 149. The pitch length B for the link 146 varies from the pitch length A shown for link 36. In FIG. 20, the pitch length B is slightly larger than the pitch length A for the link 36. However, it should be understood that the pitch length B could also be smaller than pitch length A and this would also work satisfactorily in the invention. Usually the pitch length B for the link 146 varies from the pitch length A for the standard link 36 by a distance that is from about 5% to about 50% of the pitch length A for the standard link 36.

The chain-belt 32 is formed of first sets of links 36 and at least one second set of links 146 in the manner previously described. A load block 50, as previously disclosed, is positioned in the passageway 80 that is defined by links 36 and links 146. Each set of links would only have one type of link positioned in each set and the chain-belt 32 could be a mixture of sets of links 36 and sets of links 146. The sets of links can be connected in a random pattern or a predetermined pattern.

The change of pitch length for the second sets of links 146 in the chain-belt 32 result in the load blocks 50 engaging the pulleys of a CVT at a different position than the load blocks 50 that are associated with the sets of links 36. As previously discussed this breaks up the pattern of noise produced by the chain-belt and significantly reduces the level of noise for the chain-belt.

FIG. 21 shows another feature of the invention that can be utilized to reduce the noise produced by a chain-belt 32 during operation. On the left hand side of FIG. 21, there is shown a standard link 36 as previously described. This link has spaced apart apertures 38 and 39 and a passageway 80 in which a load block 50, as previously described, can be positioned. The passageway 80 is disposed so that the center of the passageway lies along plane D. Plane D extends in a direction perpendicular to the direction of travel for the chain-belt and is equidistant from the center of the apertures 38 and 39. Thus, plane D passes substantially through the center of the link 36 and the passageway 80 is positioned symmetrically around this plane.

On the right hand side of FIG. 21, there is shown another link 156 which has spaced apart apertures 158, 159. The link 156 has a passageway 180 and the mid point of this passageway 180 is spaced apart from the plane D that passes through the center of the link 156 in a direction perpendicular to the general direction of travel for the chain-belt 32. As shown in FIG. 21, the passageway 180 is shown with its center point as shown by the line E being displaced from plane D in a direction toward the aperture 158. However, it should be understood that the center point E for the passageway 180 could also be displaced from the plane D in a direction towards the aperture 159. The center point for the passageway 180 can be displaced in either direction from the plane D by up to 35% of the pitch length of the link 156.

As previously discussed, each set of links in the chain-belt 32 will contain only one type of link; either the standard link 36 or the translated passageway links 156. At least one set of links 156 with the translated passageway would be positioned in the chain-belt. The chain-belt 32 can be a mixture of sets of links where each set has links of a particular orientation. If a chain-belt is constructed of sets of differently oriented links, the sets of links can be connected in a random pattern or a predetermined pattern to form the chain-belt.

As previously discussed, the translated passageway 180 of the links 156 will cause the load blocks 50 to strike the sheaves of the pulleys of the CVT in a different place than the load blocks of the standard links 36. This changes the pattern and frequency of the noise produced by the chain-belt 32 and reduces the overall noise produced by the chain-belt during operation.

FIG. 22 shows another feature of the present invention that can be utilized to reduce the noise produced by a chain-belt 32. In FIG. 22 a standard link 36 is shown on the left hand side of the figure. This link has spaced apart apertures 38 and 39, and a passageway 80 in which a load block 50, as previously described, can be positioned. The apertures 38 and 39 have a center point and the center point of the apertures is located upon reference line 175 which passes substantially through the center of the link 36 in a direction substantially parallel to the direction of travel for the chain-belt 32. The top of the passageway 80 is spaced apart from the reference line 175 by a distance F.

On the right hand side of FIG. 22 there is shown a link 166 that has spaced apart apertures 168 and 169 and the centers of these apertures are located along reference line 175 that passes substantially through the center of the link 166. A passageway 181 is positioned in the link 166 for receiving a load block 50, as previously described. The top of passageway 181 is spaced apart from the reference line 175 by a distance G. The distance G is designed to vary from the distance F shown for the standard links 36. As shown in FIG. 22, the distance G is shown as being slightly larger than the distance F which the passageway 80 is spaced apart from the reference line 175. However, it should be recognized that the distance G could be either greater or smaller than the distance F shown for the standard links 36. The distance G that the top of passageway 181 is spaced apart from reference line 175 can vary, in either direction, from the distance F for a standard link 36 up to 10% of the pitch length of the link 166.

A chain-belt 32 can be constructed utilizing sets of standard links 36 and sets of links 166 in a manner previously described. The sets of links 166 can be positioned in a random or predetermined pattern in the chain-belt. The sets utilizing the links 166 wig have the load blocks 50 positioned at a different orientation with respect to the reference line 175 than the load blocks 50 in the sets utilizing the standard links 136. This will result in the load blocks 50 in the sets having links 166 contacting the pulleys of the CVT at a different position than the load blocks 50 associated with the sets of standard links 36.

This will break up the pattern of noise produced by the CVT and reduce the noise generated by the chain-belt 32 during operation.

FIG. 23 shows another feature of the invention that can be utilized to reduce the noise generated by a chain-belt 32. The concept utilized in this embodiment is similar to the concept of U.S. Pat. Nos. 4,516,964 and 4,516,964 is hereby expressly incorporated by reference into this patent application as this will greatly simplify the explanation of the features of the invention. The primary difference between the teachings of the '964 patent and the present invention is that the load blocks and system for retaining the load blocks in the chain-belt is different than that shown in the '964 patent.

In the top of FIG. 23 there is shown a chain-belt 32 that is constructed in the manner previously described in this patent application. A load block 50 is connected to the chain-belt 32 in a manner previously described. The load block 50 has a width that is represented by the line H. The chain-belt 32 shown in the lower portion of FIG. 23 is substantially identical to the previously discussed chain-belt except that this chain-belt 32 has a load block 150 associated therewith and the width of load block 150 is represented by the line I. The load block 150 is substantially identical to the load block 50 except that the width of the load 150 varies slightly from the width of the load block 50. As shown in FIG. 23, the load block 150 is slightly narrower than the load block 50. Usually the load block 150 will be from about 0.002 to about 0.008 of an inch wider or narrower than the load block 50 that is also utilized in the chain-belt.

The chain-belt 32 is constructed with at least one set of links forming the chain-belt have a load block 150. In addition, the load blocks 150 can be randomly dispersed throughout the chain-belt 32 or a predetermined pattern for the load blocks 150 can be utilized. The variation in width for the load blocks 50 and the load blocks 150 is small enough that all of the load blocks will contact the sheaves of the pulleys for the CVT. However, since the load blocks vary in width the load blocks will contact the sheaves at different radial positions and this breaks up the pattern of noise produced by the load blocks striking the sheaves and greatly reduces the overall noise generated by the chain-belt during operation, as previously described. Because the sheaves of the pulleys are at an angle, the radial displacement in the pulleys for the load block 150 will be considerably larger than the width distance between the load block 50 and the load block 150.

Figure 24:
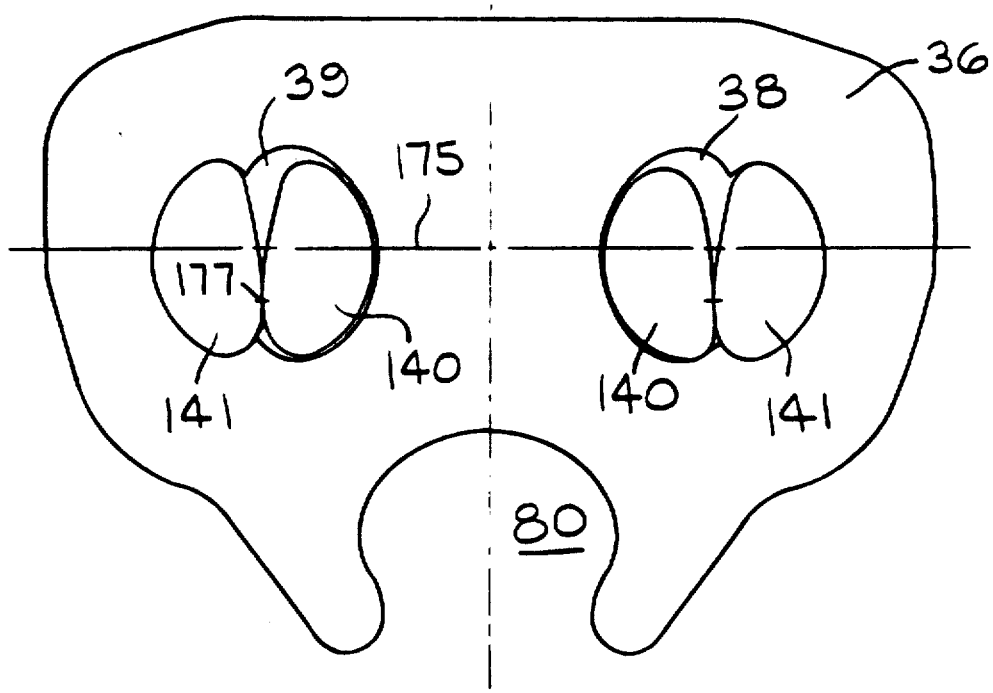
FIG. 24 is a front view of a link and pin arrangement of the invention.
Figure 25:
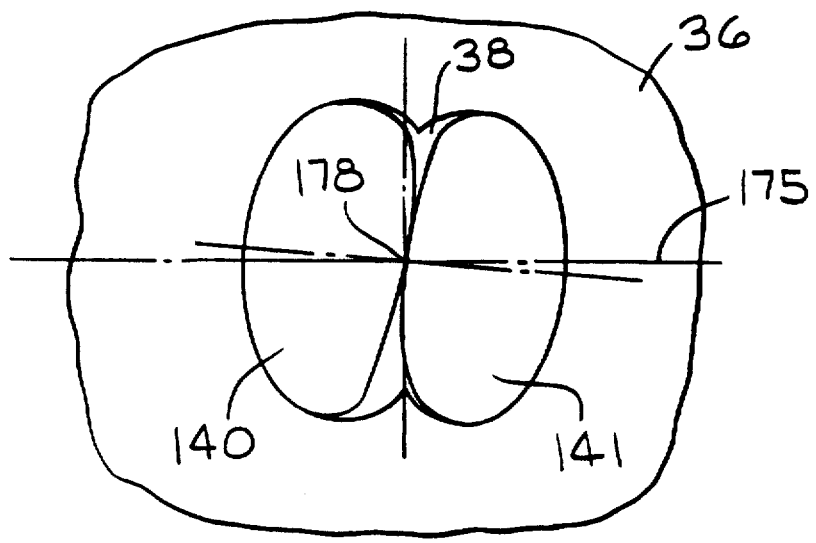
FIG. 25 is a partial front view of a link and pin arrangement.
Figure 26:
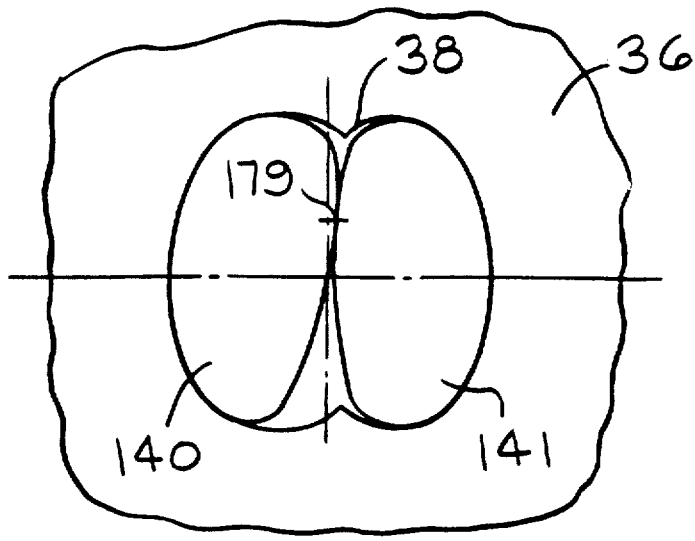
FIG. 26 is a partial front view of a link and pin arrangement.

FIGS. 24–26 shows another feature of the invention that can be utilized to reduce the noise that is generated by a chain-belt. The concept shown in FIG. 24 is similar to the concept taught in U.S. Pat. No. 4,708,701 and 4,708,701 is expressly incorporated by reference into this patent application as this will simplify the explanation of the invention. The primary differences between the '701 patent and the present invention is the shape of the load blocks and the system for retaining the load blocks in connection with the chain-belt 32.

FIG. 24 shows a standard link 36 that has spaced apart apertures 38, 39 and the center point of the apertures is located along reference line 175 that passes substantially through the center of the link 36 in a direction parallel to the direction of travel of tile chain-belt 32. The link 36 also has a passageway 80 for receiving a load block 50, as previously described. Pivot means are positioned in the aligned apertures 38, 39, to join together the interleaved sets of links as previously disclosed. The pivot means comprise a pair of asymmetrical pins 140, 141, that act as a pin and rocker allowing the adjacent links to articulate. Because of the asymmetrical nature of the pins 140, 141, the contact point 177 between the two pins in FIG. 24 is displaced from the reference line 175 that passes through the center of the apertures 38, 39, In a direction towards the passageway 80. The contact point 177 for the pins 140, 141, defines the articulation point for the sets of links 36 that form the chain-belt 32. By utilizing the asymmetrical pins 140, 141, it is possible to move this articulation point from the center point for the apertures 38, 39. The asymmetrical pins change the position that the load blocks 50, in the passageways 80 contact the sheaves of the pulleys of the CVT and reduce the noise generated by the chain-belt. As shown in FIG. 25 and as disclosed in the '701 patent, if one of the asymmetrical pins 140, 141, is inserted in the opposite orientation, the contact point 178 will be at substantially the reference line 175 which passes through the mid point of the apertures 38, 39. As shown in FIG. 26, if both asymmetrical pins 140, 141, in the apertures 38, 39, are rotated, the contact point 179 is spaced apart from the reference line 175 in a direction away from the passageway 80. Thus, by utilizing the asymmetrical pins 140, 141, it is possible to move the contact point for the pins and change the articulation point for the sets of links. The different articulation points for the sets of links results in the load blocks 50, as previously disclosed, contacting the pulleys sheaves at different locations and this reduces the noise that is generated by the chain-belt 32. The asymmetrical pins can be randomly positioned in the chain-belt or they can be positioned in a predetermined pattern to produce the desired noise characteristics.

The concept shown in FIGS. 24–26 produce a chain-belt that is very similar in operation and noise reduction to the translated aperture concept shown in FIG. 19. However, the noise reduction advantages are accomplished by changing the pins that are utilized to join the sets of links together to form the chain-belt 32. It is cheaper and easier to modify the pins than it is to modify the apertures in the links. It is also easier to build a chain-belt utilizing the asymmetrical pins as there is very little chance that the pins can be inserted improperly. Thus the embodiment shown in FIGS. 24–26 provide a way for reducing the noise generated by the chain-belt 32 that is inexpensive and easy to manufacture.

Figure 27:
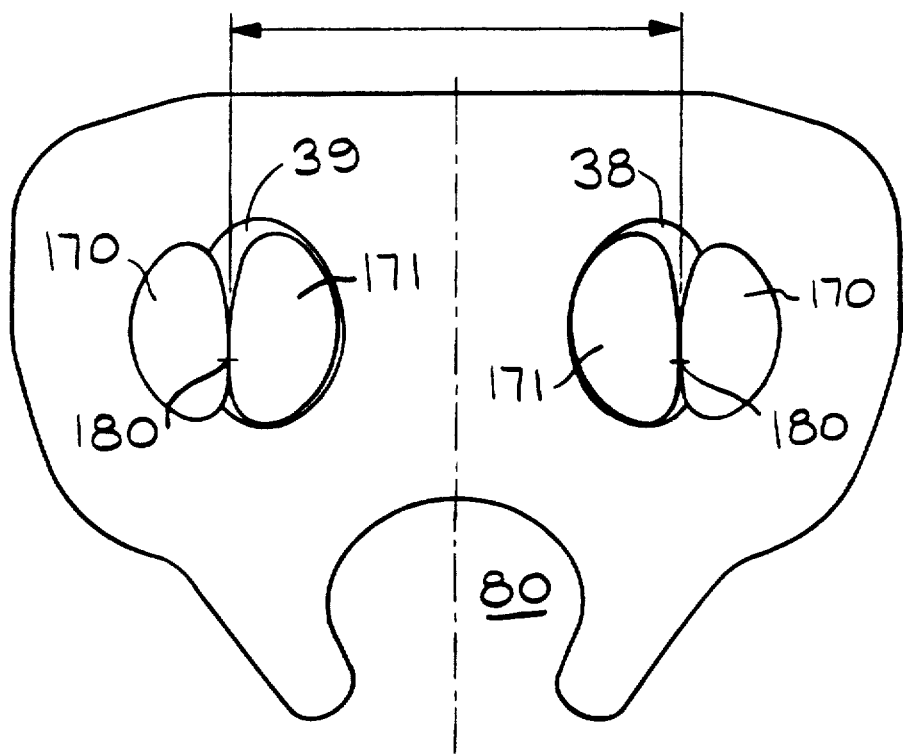
FIG. 27 is a front view of a link and pin arrangemtn of the present invention.

FIG. 27 shows another feature of the invention that can be utilized to reduce noise produced by a chain-belt 32 during operation. In FIG. 27, there is a standard link 36 that has a pair of spaced apart apertures 38, 39, and a passageway 80 for receiving a load block 50, as previously described. Positioned in the apertures 38, 39, are a pair of pins 170, 171 that define pivot means 173. In this embodiment though the pins 170, 171, are not the same size. Instead, the pin 171 is considerably bigger than the pin 170. The pin 171 is slightly larger and the pin 170 is slightly smaller than the pins 40 previously described in this patent application. The use of the pins 170, 171, changes the location of the point of contact 180 for the pins 170, 171, with respect to the apertures 38, 39. As shown in FIG. 27 the point of contact 180 in the apertures 38, 39 is spaced further apart and accordingly the points of articulation for the chain-belt utilizing a set of links 36 with the pins 170, 171, is spaced further apart. This in effect lengthens the effective pitch lengths for the set of links utilizing the pins 170, 171. Of course, it should be understood that the pins could be configured so that the point of contact 180 between the pins 170, 171, could be moved closer together so that the effective pitch length of the sets of links utilizing the pins 170, 171, is reduced In length. By utilizing the pins shown in FIG. 27 the effective pitch length for a set of links can be increased or decreased and this results in the load block 50 positioned in the passageway 80 contacting the sheaves of the pulleys in a CVT at a different location than the load blocks associated with a standard link 36 using the standard pins 40. The sets of links utilizing the pins 170, 171, can be randomly dispersed in the chain-belt 32 or a predetermined pattern can be utilized for positioning these sets of links in the chain-belt. The concept shown in FIG. 27 produces a set of links in the chain-belt that is very similar to the sets that utilize links 146 as shown in FIG. 20. However, in this particular embodiment the change in the effective pitch length of the sets of links is accomplished by modifying the pins that are positioned in the apertures 38, 39, instead of producing another series of links were the apertures in the links have been moved.

Figure 29:
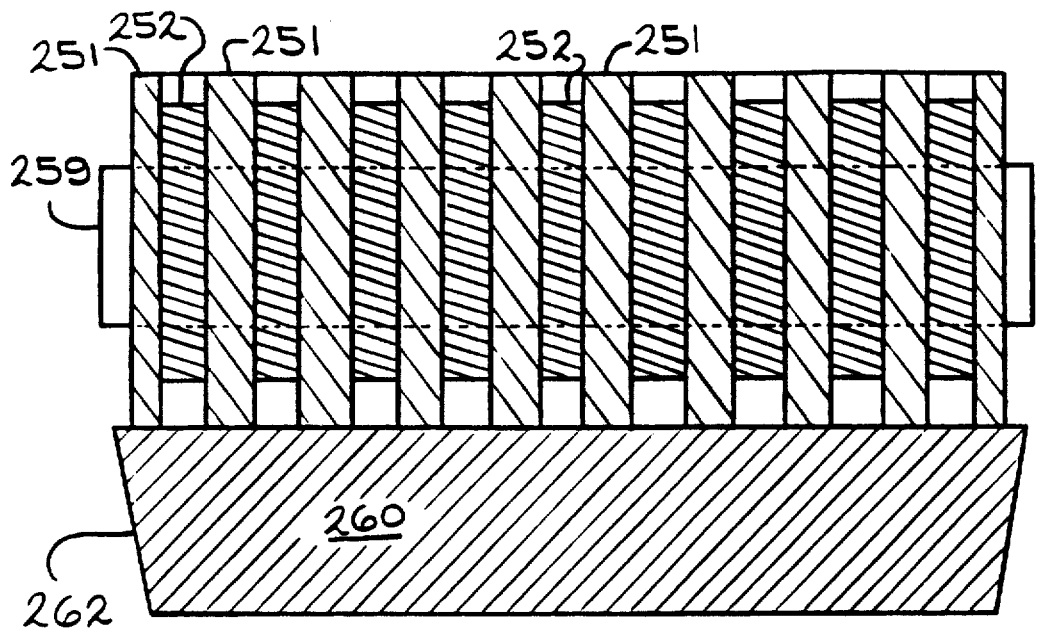
FIG. 29 is a cross-sectional view similar to FIG. 4 and showing the FIG. 19 embodiment in an assembled relationship.

FIGS. 28 and 29 show another embodiment of a chain-belt 250, according to the present invention. The chain-belt 250 includes a plurality of links 251 and 252. The links 251 and 252 are generally similar in elevation, however, their thicknesses sometimes vary depending upon the location and purpose of the links in the chain-belt 250. The links 251 and 252 include body portions 253 and depending toes 254 which define a passageway 255. The links 252 and 253 define spaced apertures 258 which receive transversely extending pins 259.

The chain-belt 250 also includes a transversely extending load block 260 having a central portion 261 which is positioned in aligned passageways 255 of the links 251 or 252. The ends 262 of the load blocks 260 are shaped to engage the walls of the pulleys 12 and 14 of the CVT 10. The load blocks 260 also define groove portions 263 adjacent the ends 262. The groove portions 263 are positioned on each side of the load blocks 260 and the groove portions extend in a direction that is substantially perpendicular to the direction of travel for the chain-belt 250. A retaining link 266 having a lower retaining passageway 267 is positioned adjacent the ends 262 of the load block 260 such that the groove portion 263 is positioned within the retaining passageways 267. Usually the retaining passageway 267 is press fit on the groove portion 263 to hold the load blocks 260 in position in the passageway 255. The retaining links 266 include openings 268. The pins 259 define stepped ends 269 which are received and secured in the openings 268.

Figure 30:
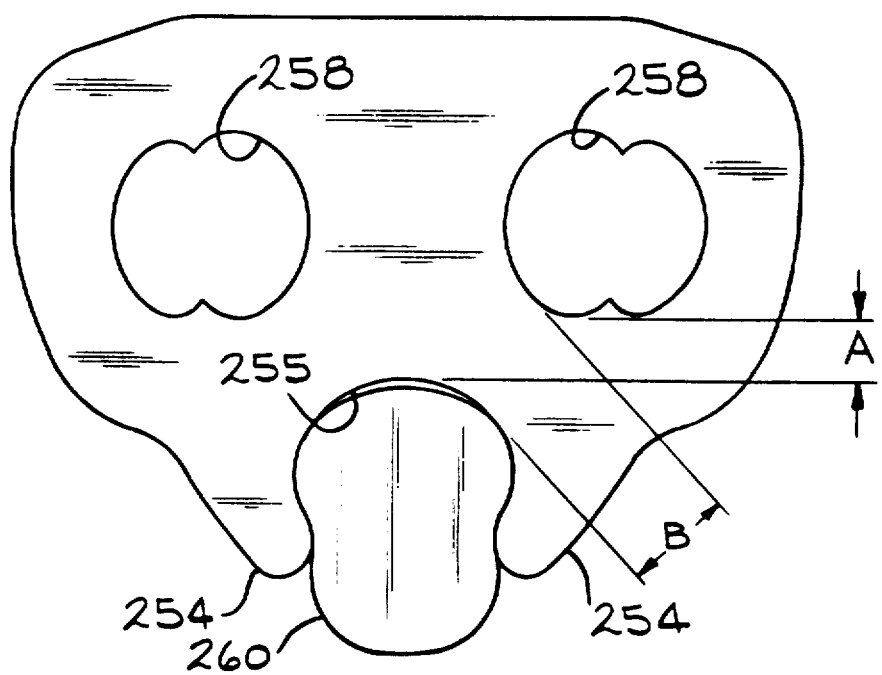
FIG. 30 is a side elevational view of a link portion of a chain, according to the present invention.

Referring to FIG. 30, the links 251 or 252 of the chain-belt 250 have a distance "A" which is the distance between a tangent line drawn at the bottom of the apertures 258 and a tangent line drawn at the upper end of the passageway 255. The dimension "B" indicates the shortest distance between the apertures 258 and the passageway 255. The portion of the link represented by dimension "B" must be adequate to provide strength for the link. The dimension "A" and the dimension "B" are directly related. If it is desired to increase the strength of a link the dimension "A" can be increased to allow dimension "B" to increase. If dimension "A" is not increased it will be necessary to move the apertures 258 further apart to provide enough material in the area of the link represented by dimension "A" to have adequate strength in the link. Moving the aperture 258 further apart increases the pitch length of the chain-belt 250 which results in a noiser less desirable chain-belt. Also, if it is desirable to decrease the pitch length of the links in a chain-belt, the dimension "A" can be increased to provide more material in the region of the link represented by dimension "B". Thus, increasing the dimension "A" can be a way to maintain the strength of the link while decreasing the pitch length of the link. The distance "A" must be at least 7.0% of the pitch and preferably at least 15.0% of the pitch. The upper limit of dimension "A" is less important and can run from 21.0% to 50% or more of the pitch.

Another advantage of the chain structure shown in FIG. 30 is that the bottom of the load block 160 extends below the toes 254 that form the passageways 255. This allows the bottom of the load block 160 to move deeper within the CVT pulleys 12 and 14. This characteristic increases the ratio coverage of the CVT.

The above description is given for the sake of explanation. Various substitutions and modifications, other than those cited, can be made without departing from the scope of the following claims.

I claim:

1. A chain-belt (32) especially adaptable for connecting the pulleys (12, 14) of a pulley transmission (10) comprising:
    a plurality of interleaved sets (34) of links (36 136), each set (34) having a plurality of transversely arranged links (36, 136), said links having a reference line (175) generally parallel to the direction of travel for said chain-belt (32);
    a pair of longitudinally spaced apart apertures (38, 39, 138, 139) positioned in said links (36, 136), said apertures having a center, at least some of said centers of said apertures (138, 139) being spaced apart from said reference line (175);
    a pivot means (40) joining said adjacent sets (34) of links (36, 136) to form an endless loop;
    a passageway (80) defined by said sets (34) of links (36, 136);
    a passageway (80) defined by said sets (34) of links (36, 136);
    a plurality of load blocks (50) connected to said links (36, 136), said load blocks (50) extending substantially across the width of said sets (34) of links and being positioned in said passageway (80), said passageway (80) partially enclosing said load blocks (50) wherein a portion of said load blocks (50) extend from said passageway (80) in a direction away from said links (36, 136); said load blocks (50) connected to said sets of links (136) contacting said pulleys (12, 14) at a different location that said load blocks (50) connected to said sets of links (36) whereby the noise produced by said chain-belt (32) is reduced.

2. The chain-belt (32) of claim 1, wherein said sets of links (136) having said centers of apertures (138, 139) spaced from said reference line (175) are randomly positioned in said chain-belt (32).

3. The chain-belt (32) of claim 1, wherein said sets of links (136) having said centers of said apertures (138, 139) spaced from said reference line (175) are positioned in said chain-belt (32) in a predetermined pattern.

4. The chain-belt (32) of claim 1, wherein said sets of links (136) having said centers of said apertures (138, 139) spaced apart from said reference line (175) have a portion of said sets of links (136) having said apertures (138, 139) spaced from said reference line in a direction towards said passageway (80) and a portion of said sets of links 9136) having said apertures (138, 139) spaced from said reference line (175) in a direction away from said passageway (80).

5. The chain-belt (32) of claim 1, wherein said sets of links (136) having said centers of said apertures (138, 139) spaced from said reference line (175) have both apertures in said links (136) spaced from said reference line (175) in the same direction.

6. The chain-belt (32) of claim 1, wherein said sets of links (136) having said centers of said apertures (138, 139) spaced from said reference line (175) have said apertures (138, 139) in said link (136) spaced from said reference line (175) in opposite directions.

7. The chain-belt (32) of claim 1, wherein said sets of links (136) have said centers of said apertures on only one end of said links (136) spaced from said reference line (175), said links (136) in said set being located on said reference line (175).

8. The chain-belt (32) of claim 1, wherein sone sets of links (36) have said centers of said apertures located on said reference line (175).

9. The chain-belt (32) of claim 1, wherein said sets of said links (136) having said centers of said apertures (138, 139) spaced from said reference line have said apertures (138, 139) spaced from said reference line up to approximately 5% of the distance between said centers of said aperture (138, 139).

10. A chain-belt (32) especially adaptable for connecting the pulleys (12, 14) of a pulley transmission (10) comprising:
  a plurality of interleaved first sets of links (36), each first set having a plurality of transversely arranged links (36), said links (36) having an aperture (38, 39) located on each end, said aperture (38, 39) having a center and said centers of said apertures (38, 39) are spaced apart a substantially uniform distance;
  at least a second interleaved set of links (146), each second set having a plurality of transversely arranged links (146), said links (146) having an aperture (148, 149) located on each end, said apertures (148, 149) having a center and said centers are spaced apart a substantially uniform distance that varies from said distance that said apertures are spaced apart in said links (36);
  pivot means (40) joining said adjacent first and second sets of links (36, 146) to form an endless loop;
  passageway (80) defined by said sets of links (36, 46), and
  a plurality of load blocks (50) connected to said links (36, 146), said load blocks (50) extending substantially across the width of said interleaved sets of links (36, 146), said load blocks (50) being positioned in said passageways (80) said load blocks (50) being located only on said side of said sets of links (36, 146) where said passageway (80) is located, said passageways (80) acting to assist in retaining said load blocks (50) in position adjacent said links (36, 146), said passageways (80) partially enclosing said load blocks (50) wherein a portion of said load blocks (50) extend from said passageways (80) in a direction away from said links, each load block (50) having edge surfaces (88) for contacting said pulleys (12, 14) of said transmission (10).

11. The chain-belt (32) of claim 10, wherein said second set of links (146) are randomly positioned in said chain-belt (32).

12. The chain-belt (32) of claim 10, wherein said second set of links (146) are positioned in said chain-belt (32) in a predetermined pattern.

13. The chain-belt (32) of claim 10, wherein said center of said apertures (148, 149) of said links (146) are spaced further apart than said centers of said apertures (38, 39) of said links (36).

14. The chain-belt (32) of claim 10, wherein said centers of said apertures (148, 149) of said links (146) are spaced closer together than said centers of said apertures (38, 39) of said links (36).

15. The chain-belt (32) of claim 10, wherein the distance between said centers of said apertures (148, 149) of said links (146) in said second set is from about 5% to about 50% longer than the distance between said centers of said apertures (38, 39) of said links (36) in said first set.

16. A chain-belt (32) especially adaptable for connecting the pulleys (12, 14) of a pulley transmission (10) comprising:
  a plurality of interleaved sets of links (36), each set having a plurality of transversely arranged links (36);
  pivot means (40) joining said adjacent sets of links (36) to form an endless loop;
  a passageway (80) defined by said sets (34) of links (36), and
  a first plurality of load blocks (50) and a second plurality of load blocks (150) connected to said links (36), said first and second load blocks (50, 150) extending substantially across the width of said interleaved sets (34) of links (36), said first and second load blocks (50, 150) being positioned in said passageways (80), said first and second load blocks (50, 150) being located only on said side of said sets of links (36) where said passageway (80) is located, said passageways (80) acting to assit in retaining said first and second load blocks (50, 150) in position adjacent said links (36), said passageways (80) partially enclosing said first and second load blocks (50, 150) wherein a portion of said first and second load blocks (50, 150) extend from said passageways (80) in a direction away from said links, each first and second load blocks (50, 150) having edge surfaces (88) for contacting said pulleys (12, 14) of said transmission (10), said second load blocks (150) having a width that varies slightly from said first load blocks (50), said second load blocks (150) contacting said pulleys (12, 14) at a different point than said first load blocks (50) whereby the noise produced by said chain-belt (32) during operation is reduced.

17. The chain-belt (32) of claim 16, wherein said second load blocks (150) are randomly positioned in said chain-belt (32).

18. The chain-belt (32) of claim 16, wherein said second load blocks (150) are positioned in said chain-belt (32) in a predetermined pattern.

19. A chain-belt (32) especially adaptable for connecting the pulleys (12, 14) of a pulley transmission (10) comprising:
  a plurality of interleaved sets (34) of links (36), each set (34) having a plurality of transversely arranged links (36), said links (36) having an aperture (38, 39) located on each end, said apertures having a center and said centers of said apertures are located on a reference line (175) that is substantially parallel to the direction of travel for said chain-belt (32);

pivot means (40) joining said adjacent sets (34) of links (36) to form an endless loop, said pivot means comprising a pair of asymmetrical pins (140, 141) that are positioned in said apertures (38, 39) to connect said sets (34) of links (36), said pins (140, 141) having a contact point that defines the point of articulation for said joined sets (34) of links (36), said pins (140, 141) being positioned so that said contact point for said pins (140, 141) in some of said apertures (38, 39) is located on said reference line (175), said pins (140, 141) being positioned in at least an aperture (38, 39) of one set (34) of links (36) where said contact point for said pins (140, 141) is displaced from said reference line (175) whereby said point of articulation for apertures (38, 39) in said set of links (36) is different than said sets of links (36) where said contact point for said pins (140, 141) is positioned along said reference line a passageway (80) defined by said sets (34) of links (36), and a plurality of load blocks (50) connected to said links (36), said load blocks (50) extending substantially across the width of said interleaved sets (34) of links (36), said load blocks (50) being positioned in said passageways (80) said load blocks (50) being located only on said side of said sets (34) of links (36) where said passageway (80) is located, said passageway (80) acting to assist in retaining said load blocks (50) in position adjacent said links (36), said passageway (80) partially enclosing said load blocks (50) wherein a portion of said load blocks (50) extend from said passageways (80) in a direction away from said links, each load block (50) having edge surfaces (88) for contacting said pulleys (12, 14) of said transmission (10), displaced contact point for said asymmetrical pins (140, 141) causing said load blocks (50) to contact said pulleys (12, 14) at different locations whereby said noise produced by said chain-belt (32) is reduced.

20. The chain-belt (32) of claim 19, wherein said pins (140, 141) having a contact point displaced from said reference line (175) are randomly positioned in said apertures (38, 39) of said sets (34) of links (36).

21. The chain-belt of claim 19, wherein said pins (140, 141) having a contact point displaced from said reference line (175) are positioned in said apertures (38, 39) of said sets (34) of links (36) in a predetermined patterns.

22. The chain-belt (32) of claim 19, wherein said contact point for a portion of said pins (140, 141) is spaced from said reference line (175) in a direction towards said passageway (80) and a said contact point for a portion of said pins (140, 141) is spaced apart from said reference line (175) in a direction away from said passageway (80).

23. The chain-belt (32) of claim 19, wherein said sets (34) of links (36) have said contact point for said pins (140, 141) in said apertures (38, 39) displaced from said reference line (175) in the same direction.

24. The chain-belt (32) of claim 19, wherein said sets (34) of links (36) have said contact point for said pins (140, 141) in said apertures displaced from said reference line (175) in opposite directions.

25. The chain-belt (32) of claim 19, wherein said point of contact for said pins (140, 141) in one aperture (38, 39) for a set (34) of links (36) is spaced from said reference line (175) and said point of contact for said pins (140, 141) in said other aperture (38, 39) for said set (34) of links (36) is located substantially on said reference line (175).

26. The chain-belt (32) of claim 19, wherein said point of contact for said pins (140, 141) can be displaced in either direction from said reference line (175) a distance that can be up to about 10% of the pitch length for said links (36).

27. A chain-belt (32) especially adaptable for connecting the pulleys (12, 14) of a pulley transmission (10) comprising:

a plurality of interleaved sets (34) of links (36), each set (34) having a plurality of transversely arranged links (36), said links (36) having an aperture (38, 39) located on each end;

first pivot means (40) joining a portion of said adjacent sets (34) of links (36) and second pivot means (173) joining the rest of said adjacent sets (34) of links (36) to form an endless loop, said first and second pivot means (40, 173) being positioned in said apertures (38, 39) in said links (36), said first pivot means (40) has a first and second pins (40) positioned in said apertures (38, 39), said second pivot means (173) has a first pin (170) and a second pin (171) positioned in said aperture (38, 39), said first (170) and second (171) pins of said second pivot means (173) having a diameter different than said diameter of said first and second pins (40) of said first pivot means (40), said point of contact between said pins (170, 171) in said apertures (38, 39) on a link (36) define a pitch length for said link (36) whereby utilizing said first (40) and second (173) pivot means alters said pitch length for said sets (34) of links (36);

a passageway (80) defined by said sets (34) of links (36), and a plurality of load blocks (50) connected to said links (36), said load blocks (50) extending substantially across the width of said interleaved sets (34) of links (36), said load blocks (50) being positioned in said passageways (80) said load blocks (50) being located only on said side of said sets (34) of links (36) where said passageway (80) is located, said passageway (80) acting to assist in retaining said load blocks (50) in position adjacent said links (36), said passageway (80) partially enclosing said load blocks (50) wherein a portion of said load blocks (50) extend from said passageway (80) in a direction away from said links (36), each load block (50) having edge surfaces (88) for contacting said pulleys (12, 14) of said transmission (10) said load blocks associated with said sets of links (36) utilizing said second pivot means (173) contact said pulleys at a different point than said sets of links (36) utilizing said first pivot means (40) whereby the noise produced by said chain-belt (32) during use is reduced.

28. The chain-belt (32) of claim 27, wherein said first pin (170) and second pin (171) of second pivot means (173) are configured to increase the pitch length for said sets of links (36) utilizing said second pivot means (173) over the pitch length for said sets of links utilizing said first pivot means (40).

29. The chain-belt (32) of claim 27, wherein said first pin (170) and second pin (171) of said second pivot means (173) are configured to decrease the pitch length for said sets of links (36) utilizing said second pivot means (173) over the pitch length for said sets of links (36) utilizing said first pivot means (40).

30. The chain-belt (32) of claim 27, wherein said pitch length for said sets (34) of links (36) utilizing said second pivot means can vary from about 2% to about 20% from the pitch length of said sets (34) of links (36) utilizing said first pivot means (40).

31. The chain-belt (32) of claim 27, wherein said second pivot means (173) are randomly positioned in said chain-belt (32).

32. The chain-belt (32) of claim 27, wherein said second pivot means are positioned in said chain-belt (32) in a predetermined pattern.

33. A chain-belt (32) especially adaptable for connecting the pulleys (12, 14) of a pulley transmission (10) comprising:
a plurality of interleaved sets of links (251, 252), each set having a plurality of transversely arranged links (251, 252), said links (251, 252) have a pair of spaced apertures (258);
pivot means (259) joining said adjacent sets of links (251, 252) to form an endless loop, said pivot means (259) being positioned in said apertures (258) in said links (251, 252);
a passageway (255) being defined by said links (251, 252), said passageway (255) is spaced apart from said apertures (258) by a distance (A); said distance (A) being the space between a tangent line extending from the portion of said apertures (258) closest to said passageway (255) and a tangent line extending from the top of said passageway (255), said distance being a substantial portion of the distance between said spaced apertures (258); and
a plurality of load blocks (260) connected to said links (251, 252), said load blocks (260) being positioned in said passageway (255), each load block (260) having edge surfaces (262) for contacting said pulleys (12, 14) of said transmission (10).

34. The chain-belt (32) of claim 33, wherein said distance (A) is at least 7.0% of the distance between the centers of said apertues (258).

35. The chain-belt (32) of claim 33, wherein said distance (A) is at least 15.0% of the distance between the centers of said apertures (258).

36. The chain-belt (32) of claim 33, wherein said distance (A) is from about 7.0% to about 50% or more of the distance between the centers of said apertures (258).

37. The chain-belt (32) of claim 33, wherein said tangent lines that define said distance (A) are substantially parallel to the direction of travel for said chain-belt (32).

38. A chain-belt (32) especially adaptable for connecting the pulleys (12, 14) of a pulley transmission (10) comprising:
a plurality of interleaved sets of links (251, 252), each set having a plurality of transversely arranged links (251, 252);
pivot means (40) joining said adjacent set of links (251, 252) to form an endless loop;
a passageway (255) being defined by said links (251, 252);
a plurality of load blocks (260) connected to said links (251, 252), said load blocks (260) being positioned in said passageway (255), each load block (260) having edge surfaces (262) for contacting said pulleys (12, 14) of said transmission (10), said load blocks (260) having a groove (263) positioned on each end of said load blocks (260), said groove (263) extending on each side of said load blocks (260); and
a retaining link (266) positioned on the ends of each set of links (251, 252), said retaining link (266) having a retaining passageway (267) that is positioned to engage said groove (263) on said load block (260) to assist in retaining said load block (260) in said passageway (255).

39. The chain-belt (32) of claim 38, wherein said groove (263) is positioned on each Side of said load block (260) and said groove (263) extends in a direction that is substantially perpendicular to the direction of travel for said chain-belt (32).

40. The chain-belt (32) of claim 38, wherein said retaining passgeway (267) in said retaining links (266) is press fit on said groove (263) to maintain said load blocks (260) in said passageway (255).

* * * * *